United States Patent
Fakoorian et al.

(10) Patent No.: US 11,419,123 B2
(45) Date of Patent: Aug. 16, 2022

(54) UPLINK TRANSMISSION CANCELLATION

(71) Applicant: QUALCOMM Incorporated, San Diego, CA (US)

(72) Inventors: Seyed Ali Akbar Fakoorian, San Diego, CA (US); Seyedkianoush Hosseini, San Diego, CA (US); Wei Yang, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/809,406

(22) Filed: Mar. 4, 2020

(65) Prior Publication Data
US 2020/0351897 A1 Nov. 5, 2020

Related U.S. Application Data

(60) Provisional application No. 62/843,198, filed on May 3, 2019.

(51) Int. Cl.
*H04W 72/08* (2009.01)
*H04L 1/18* (2006.01)
(Continued)

(52) U.S. Cl.
CPC ........... *H04W 72/08* (2013.01); *H04L 1/1819* (2013.01); *H04L 5/1469* (2013.01);
(Continued)

(58) Field of Classification Search
CPC ............. H04W 72/08; H04W 72/0453; H04W 72/0413; H04W 72/14; H04W 72/0446;
(Continued)

(56) References Cited

U.S. PATENT DOCUMENTS

2002/0019880 A1* 2/2002 Sakakura .......... H04L 29/12311
709/245
2005/0208906 A1* 9/2005 Miyoshi ................ H04L 5/0046
455/122

(Continued)

FOREIGN PATENT DOCUMENTS

| EP | 3528515 A1 | 8/2019 |
| KR | 20190038329 A | 4/2019 |
| WO | WO-2018082686 A1 | 5/2018 |

OTHER PUBLICATIONS

International Search Report and Written Opinion—PCT/US2020/027311—ISA/EPO—dated Jun. 30, 2020.

(Continued)

*Primary Examiner* — Gregory B Sefcheck
*Assistant Examiner* — Joshua Smith
(74) *Attorney, Agent, or Firm* — Holland & Hart LLP

(57) ABSTRACT

Methods, systems, and devices for wireless communications are described. In some examples, a base station or other network entity may allocate uplink resources to UEs, or groups of UEs, that are subsequently reallocated. For example, a base station may determine a reallocation of uplink resources and issue a cancellation or preemption indication that may correspond to at least a portion of the previously-allocated resources (e.g., as allocated to particular UEs). UEs may be configured to monitor for cancellation or preemption indications, and based on received cancellation or preemption indications, UEs may determine whether or not to proceed with an uplink transmission using their previously-allocated uplink resources.

30 Claims, 17 Drawing Sheets

(51) Int. Cl.
*H04L 5/14* (2006.01)
*H04W 72/04* (2009.01)
*H04W 72/14* (2009.01)

(52) U.S. Cl.
CPC ... *H04W 72/0413* (2013.01); *H04W 72/0446* (2013.01); *H04W 72/0453* (2013.01); *H04W 72/14* (2013.01)

(58) Field of Classification Search
CPC .............. H04W 72/087; H04W 72/042; H04L 1/1819; H04L 5/1469; H04L 5/003; H04L 1/08; H04L 1/1854; H04L 5/0096
See application file for complete search history.

(56) References Cited

U.S. PATENT DOCUMENTS

| | | | | |
|---|---|---|---|---|
| 2009/0067379 A1* | 3/2009 | Kim | ...................... | H04L 5/0053 370/329 |
| 2009/0109914 A1* | 4/2009 | McBeath | ............ | H04W 72/042 370/329 |
| 2010/0040022 A1* | 2/2010 | Lindstrom | ........ | H04W 36/0055 370/331 |
| 2010/0272067 A1* | 10/2010 | Lu | ...................... | H04W 36/0072 370/331 |
| 2012/0113917 A1* | 5/2012 | Gaal | ...................... | H04L 5/1438 370/329 |
| 2012/0263117 A1* | 10/2012 | Love | ...................... | H04L 5/003 370/329 |
| 2015/0230234 A1* | 8/2015 | Choi | ...................... | H04L 5/0046 370/329 |
| 2015/0365921 A1* | 12/2015 | Wu | ........................ | H04W 4/70 370/329 |
| 2016/0080969 A1* | 3/2016 | Tseng | ...................... | H04L 43/08 370/329 |
| 2016/0234857 A1* | 8/2016 | Chen | ................. | H04W 72/1263 |
| 2016/0241328 A1* | 8/2016 | Kang | .................. | H04W 52/146 |
| 2016/0366638 A1* | 12/2016 | Kumar | .............. | H04W 52/0206 |
| 2017/0019819 A1* | 1/2017 | Yang | ................. | H04W 36/0072 |
| 2017/0041830 A1* | 2/2017 | Davis | ................ | H04W 36/0005 |
| 2017/0318580 A1* | 11/2017 | Park | ...................... | H04L 5/0053 |
| 2018/0139011 A1* | 5/2018 | Chae | ...................... | H04L 1/1861 |
| 2018/0212742 A1* | 7/2018 | Takeda | .............. | H04W 72/0406 |
| 2019/0104536 A1* | 4/2019 | Wang | ................. | H04W 72/1289 |
| 2019/0253944 A1* | 8/2019 | Kim | ................. | H04W 36/0085 |
| 2019/0364586 A1* | 11/2019 | Li | ......................... | H04W 72/04 |
| 2021/0100033 A1* | 4/2021 | Li | ...................... | H04W 72/0413 |
| 2021/0212067 A1* | 7/2021 | Hwang | ............. | H04W 72/0493 |

OTHER PUBLICATIONS

Mitsubishi Electric: "Views on Pre-Emption for UL Inter/intra UE Tx Multiplexing", 3GPP Draft, 3GPP TSG RAN WGI Ad-Hoc Meeting, R1-1900639-AH1 URLLC MITBS B, 3rd Generation Partnership Project (3GPP), Mobile Competence Centre, 650, Route Des Lucioles, F-06921 Sophia-Antipolis Cedex, France, vol. RAN WG1, No. Taipei, Taiwan, Jan. 21, 2019-Jan. 25, 2019, Jan. 20, 2019 (Jan. 20, 2019), XP051593486, 8 pages, Retrieved from the Internet: URL: http://www.3gpp.org/ftp/Meetings%5F3GPP%5FSYNC/RAN1/Docs/R1%2D1900639%2Ezip. [retrieved on Jan. 20, 2019] figures 1-5 sections 2-5.

Qualcomm Incorporated: "UL Inter UE Tx Prioritization/Multiplexing", 3GPP Draft, 3GPP TSG-RAN WG1 #94, R1-1809458, UL inter UE Tx Prioritization/Multiplexing, 3rd Generation Partnership Project (3GPP), Mobile Competence Centre, 650, Route Des Lucioles, F-06921 Sophia-Antipolis Cedex, France, vol. RAN WG1, No. Gothenburg, Sweden, Aug. 20, 2018-Aug. 24, 2018, Aug. 17, 2018 (Aug. 17, 2018), XP051516823, 12 pages, Retrieved from the Internet: URL: http://www.3gpp.org/ftp/tsg%5Fran/WG1%5FRL1/TSGR1%5F94/Docs/R1%2D1809458%2Ezip. [retrieved on Aug. 17, 2018]. figure 1 tables I, II sections 2-9.

Vivo: "Offline Discussion for UL Inter UE Tx Prioritization/Multiplexing", R1-1809995, 3GPP TSG RAN WG1 Meeting #94, Gothenburg, Sweden, Aug. 20, 2018-Aug. 24, 2018, 5 pages.

\* cited by examiner

UPLINK TRANSMISSION CANCELLATION

CROSS REFERENCE

The present Application for Patent claims the benefit of U.S. Provisional Patent Application No. 62/843,198 by FAKOORIAN et al., entitled "UPLINK TRANSMISSION CANCELLATION," filed May 3, 2019, assigned to the assignee hereof, and expressly incorporated by reference herein.

TECHNICAL FIELD

The following relates generally to wireless communications, and more specifically to uplink transmission cancellation.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Some wireless communications systems, such as NR systems, may support heterogeneous conditions for one or more service deployments. For example, communication devices, such as a base station or a UE, may support flexibility in allocating multiple supported services or traffic types over resources of a channel. As part of the allocation of channel resources, a base station and a UE may support the prioritization of some communications over others, which may include prioritization of traffic or services having different reliability thresholds, different latency thresholds, or both. In some cases, efficient system utilization may be based on how resources are shared or allocated between different traffic types, or UEs configured according to different traffic types.

SUMMARY

The described techniques relate to improved methods, systems, devices, and apparatuses that support uplink transmission cancellation. In some examples, a base station or other network entity may allocate uplink resources to UEs, or groups of UEs, that are subsequently reallocated (e.g., based on a reprioritization of communications). For example, a base station may determine a reallocation of uplink resources and issue a cancellation indication that may correspond to at least a portion of the previously-allocated resources (e.g., as allocated to particular UEs). UEs may be configured to monitor for cancellation indications, and based on received cancellation indications, UEs may determine whether or not to proceed with an uplink transmission using their previously-allocated uplink resources.

In some examples, a cancellation indication may be used to prevent a UE from using at least a portion of previously-allocated uplink resources for an uplink transmission, which may support a dynamic allocation of uplink resources from communications associated with one latency threshold to communications associated with another latency threshold. For example, resources that were originally allocated to enhanced mobile broadband (eMBB) communications may be reallocated to ultra-reliable low-latency communications (URLLC) (e.g., a reallocation towards more performance-sensitive communications). In one example, an eMBB UE that decodes an uplink cancellation indication message will cancel or otherwise preempt uplink transmission (e.g., partially or completely, depending on whether the uplink cancellation applies to allocated resources corresponding to the uplink transmission). In some examples, a particular UE may ignore a cancellation indication, such as when a cancellation indication is meant to halt uplink transmissions from other UEs in order to reallocate the uplink resources to the particular UE, or to a type of traffic that is to be transmitted by the particular UE. Thus, according to these and other examples, various types of uplink resource allocations may be canceled, preempted, or reallocated, thereby supporting a dynamic redistribution of uplink resources in a wireless communication system that more-effectively balances the performance and resource utilization of communications according to different priorities.

A method for wireless communications is described. The method may include identifying an allocation of uplink resources, receiving an uplink cancellation indication, determining whether the identified allocation of uplink resources is canceled based on the uplink cancellation indication, and performing uplink communications based on the determining.

An apparatus for wireless communications is described. The apparatus may include a processor, memory coupled (e.g., operatively, communicatively, functionally, electronically, electrically) to the processor, and instructions stored in the memory. The instructions may be executable by the processor to cause the apparatus to identify an allocation of uplink resources, receive an uplink cancellation indication, determine whether the identified allocation of uplink resources is canceled based on the uplink cancellation indication, and perform uplink communications based on the determining.

Another apparatus for wireless communications is described. The apparatus may include means for identifying an allocation of uplink resources, means for receiving an uplink cancellation indication, means for determining whether the identified allocation of uplink resources is canceled based on the uplink cancellation indication, and means for performing uplink communications based on the determining.

A non-transitory computer-readable medium storing code for wireless communications is described. The code may include instructions executable by a processor to identify an allocation of uplink resources, receive an uplink cancellation indication, determine whether the identified allocation of uplink resources is canceled based on the uplink cancellation indication, and perform uplink communications based on the determining.

In some examples of the method, apparatuses, and non-transitory computer-readable medium described herein, the allocation of uplink resources may be associated with a first type of communications and the uplink cancellation indication may be associated with a second type of communications. In some examples, the first type of communications may have a first latency threshold, and the second type of communications may have a second latency threshold that is different from the first latency threshold. In some examples, the second type of communications may have a higher priority than the first type of communications. In some examples, performing the uplink communications may include performing uplink communications of either the first type of communications or the second type of communications based on the determining In some examples of the method, apparatuses, and non-transitory computer-readable medium described herein, determining whether the identified allocation of uplink resources is canceled may include operations, features, means, or instructions for identifying a bitmap of the uplink cancellation indication associated with a set of communication resources in the time domain and frequency domain, each bit of the bitmap corresponding to a respective subset of the communication resources, and each bit indicating whether or not cancellation applies to the respective subset of the communication resources, and determining whether at least a portion of the allocation of uplink resources corresponds to one or more of the subsets of the communication resources for which cancellation applies.

In some examples of the method, apparatuses, and non-transitory computer-readable medium described herein, determining whether the identified allocation of uplink resources is canceled may include operations, features, means, or instructions for determining that the bitmap corresponds to an uplink bandwidth part configured for the UE.

Some examples of the method, apparatuses, and non-transitory computer-readable medium described herein may further include operations, features, means, or instructions for identifying a repetition indicator, and repeating bits of the bitmap according to the repetition indicator, each repeated bit of the bitmap corresponding to a respective subset of the communication resources, and each repeated bit indicating whether or not cancellation applies to the respective subset of the communication resources.

Some examples of the method, apparatuses, and non-transitory computer-readable medium described herein may further include operations, features, means, or instructions for determining that the respective subset of the communication resources corresponding to each bit of the bitmap corresponds to uplink resources of an uplink/downlink time division duplex (TDD) configuration of the UE.

Some examples of the method, apparatuses, and non-transitory computer-readable medium described herein may further include operations, features, means, or instructions for receiving a cancellation configuration, prior to receiving the uplink cancellation indication, associated with a pattern of communication resources in the time domain and frequency domain, where the uplink cancellation indication indicates a time for applying the pattern of communication resources for cancellation.

In some examples of the method, apparatuses, and non-transitory computer-readable medium described herein, the cancellation configuration includes a radio resource control (RRC) configuration.

In some examples of the method, apparatuses, and non-transitory computer-readable medium described herein, determining whether the identified allocation of uplink resources is canceled may include operations, features, means, or instructions for determining a time for applying cancellation based on a time of receiving the uplink cancellation indication and a configured time offset for cancellation.

In some examples of the method, apparatuses, and non-transitory computer-readable medium described herein, the configured time offset for cancellation may be based on a capability of the UE.

In some examples of the method, apparatuses, and non-transitory computer-readable medium described herein, determining the time for applying cancellation may be based on an uplink/downlink time division duplex (TDD) configuration of the UE.

Some examples of the method, apparatuses, and non-transitory computer-readable medium described herein may further include operations, features, means, or instructions for receiving an uplink grant after receiving the uplink cancellation indication, the uplink grant including communication resources associated with the uplink cancellation indication, and ignoring at least a portion of the uplink cancellation indication based on receiving the uplink grant after receiving the uplink cancellation indication.

In some examples of the method, apparatuses, and non-transitory computer-readable medium described herein, the uplink grant may be received in a physical downlink control channel (PDCCH).

In some examples of the method, apparatuses, and non-transitory computer-readable medium described herein, ignoring at least a portion of the uplink cancellation indication may be based on the uplink grant being associated with the second type of communications.

In some examples of the method, apparatuses, and non-transitory computer-readable medium described herein, ignoring at least a portion of the uplink cancellation indication may be based on a type of physical channel associated with the uplink grant.

In some examples of the method, apparatuses, and non-transitory computer-readable medium described herein, determining whether the identified allocation of uplink resources is canceled may be based on a type of physical channel associated with the uplink communications.

In some examples of the method, apparatuses, and non-transitory computer-readable medium described herein, determining whether the identified allocation of uplink resources is canceled may be based on a type of physical channel associated with the uplink cancellation indication.

In some examples of the method, apparatuses, and non-transitory computer-readable medium described herein, determining whether the identified allocation of uplink resources is canceled may be based on an allocation type associated with the identified allocation of uplink resources.

In some examples of the method, apparatuses, and non-transitory computer-readable medium described herein, determining whether the identified allocation of uplink resources is canceled may be based on the second type of communications.

In some examples of the method, apparatuses, and non-transitory computer-readable medium described herein, determining whether the identified allocation of uplink resources is canceled may be based on a type of communications associated with the uplink communications.

In some examples of the method, apparatuses, and non-transitory computer-readable medium described herein, the uplink cancellation indication may be received in a group common physical downlink control channel (GC-PDCCH).

In some examples of the method, apparatuses, and non-transitory computer-readable medium described herein, performing the uplink communications may include operations, features, means, or instructions for transmitting an uplink transmission on a subset of the allocation of uplink resources based on the determining.

In some examples of the method, apparatuses, and non-transitory computer-readable medium described herein, performing the uplink communications may include operations, features, means, or instructions for refraining from using at least a portion of the allocation of uplink resources based on the determining.

In some examples of the method, apparatuses, and non-transitory computer-readable medium described herein, the first type of communications includes enhanced mobile broadband (eMBB) communications and the second type of communications includes ultra-reliable low latency communications (URLLC).

A method for wireless communications is described. The method may include transmitting an allocation of uplink resources, determining a reallocation of the uplink resources, and transmitting an uplink cancellation indication corresponding to the uplink resources based on the determining.

An apparatus for wireless communications is described. The apparatus may include a processor, memory coupled (e.g., operatively, communicatively, functionally, electronically, electrically) to the processor, and instructions stored in the memory. The instructions may be executable by the processor to cause the apparatus to transmit an allocation of uplink resources, determine a reallocation of the uplink resources, and transmit an uplink cancellation indication corresponding to the uplink resources based on the determining.

Another apparatus for wireless communications is described. The apparatus may include means for transmitting an allocation of uplink resources, means for determining a reallocation of the uplink resources, and means for transmitting an uplink cancellation indication corresponding to the uplink resources based on the determining.

A non-transitory computer-readable medium storing code for wireless communications is described. The code may include instructions executable by a processor to transmit an allocation of uplink resources, determine a reallocation of the uplink resources, and transmit an uplink cancellation indication corresponding to the uplink resources based on the determining.

In some examples of the method, apparatuses, and non-transitory computer-readable medium described herein, the allocation of uplink resources may be associated with a first type of communications and determining the reallocation of the uplink resources may be based on a second type of communications. In some examples, the first type of communications may have a first latency threshold, and the second type of communications may have a second latency threshold that is different from the first latency threshold. In some examples, the second type of communications may have a higher priority than the first type of communications.

Some examples of the method, apparatuses, and non-transitory computer-readable medium described herein may further include operations, features, means, or instructions for generating a bitmap associated with a set of communication resources in the time domain and frequency domain, each bit of the bitmap corresponding to a respective subset of the communication resources, and each bit indicating whether or not cancellation applies to the respective subset of the communication resources, and transmitting the uplink cancellation indication may include transmitting the bitmap.

In some examples of the method, apparatuses, and non-transitory computer-readable medium described herein, the bitmap corresponds to a configured uplink bandwidth part.

In some examples of the method, apparatuses, and non-transitory computer-readable medium described herein, transmitting the uplink cancellation indication may include operations, features, means, or instructions for transmitting a repetition indicator associated with the bitmap.

In some examples of the method, apparatuses, and non-transitory computer-readable medium described herein, the respective subset of the communication resources corresponding to each bit of the bitmap corresponds to uplink resources of an uplink/downlink TDD configuration.

Some examples of the method, apparatuses, and non-transitory computer-readable medium described herein may further include operations, features, means, or instructions for transmitting a cancellation configuration, prior to transmitting the uplink cancellation indication, associated with a pattern of communication resources in the time domain and frequency domain, and the uplink cancellation indication may indicate a time for applying the pattern of communication resources for cancellation.

In some examples of the method, apparatuses, and non-transitory computer-readable medium described herein, transmitting the cancellation configuration may include operations, features, means, or instructions for transmitting an RRC configuration.

In some examples of the method, apparatuses, and non-transitory computer-readable medium described herein, determining the reallocation of resources may include operations, features, means, or instructions for determining a time for applying cancellation based on a time of transmitting the uplink cancellation indication and a configured time offset for cancellation.

In some examples of the method, apparatuses, and non-transitory computer-readable medium described herein, the configured time offset for cancellation may be based on a UE capability.

In some examples of the method, apparatuses, and non-transitory computer-readable medium described herein, determining the time for applying cancellation may be based on an uplink/downlink time division duplex (TDD) configuration.

Some examples of the method, apparatuses, and non-transitory computer-readable medium described herein may further include operations, features, means, or instructions for transmitting, to a UE, an uplink grant including communication resources associated with the uplink cancellation indication, the uplink grant indicating to the UE to ignore at least a portion of the uplink cancellation indication.

In some examples of the method, apparatuses, and non-transitory computer-readable medium described herein, the uplink grant may be transmitted in a physical downlink control channel (PDCCH).

In some examples of the method, apparatuses, and non-transitory computer-readable medium described herein, the uplink grant may be associated with the second type of communications, and the indication to the UE to ignore at least a portion of the uplink cancellation indication may be based on the uplink grant being associated with the second type of communications.

In some examples of the method, apparatuses, and non-transitory computer-readable medium described herein, the uplink grant may be associated with a type of physical channel, and the indication to the UE to ignore at least a portion of the uplink cancellation indication may be based on the type of physical channel.

In some examples of the method, apparatuses, and non-transitory computer-readable medium described herein, determining the reallocation of the uplink resources may include operations, features, means, or instructions for determining a reallocation of uplink resources allocated to a physical random access channel (PRACH) based at least in part on a triggering condition for transmissions associated with the uplink resources allocated to the PRACH.

In some examples of the method, apparatuses, and non-transitory computer-readable medium described herein, the uplink cancellation indication may be specific to a type of uplink physical channel.

In some examples of the method, apparatuses, and non-transitory computer-readable medium described herein, the uplink cancellation indication may be specific to a type of uplink resource allocation.

In some examples of the method, apparatuses, and non-transitory computer-readable medium described herein, transmitting the uplink cancellation indication may include operations, features, means, or instructions for transmitting a group common physical downlink control channel (GC-PDCCH).

Some examples of the method, apparatuses, and non-transitory computer-readable medium described herein may further include operations, features, means, or instructions for receiving communications from one or more user equipments (UEs) based on the reallocation of the uplink resources and transmitting the uplink cancellation indication.

In some examples of the method, apparatuses, and non-transitory computer-readable medium described herein, the first type of communications includes enhanced mobile broadband (eMBB) communications and the second type of communications includes ultra-reliable low latency communications (URLLC).

DETAILED DESCRIPTION

Figure 1:
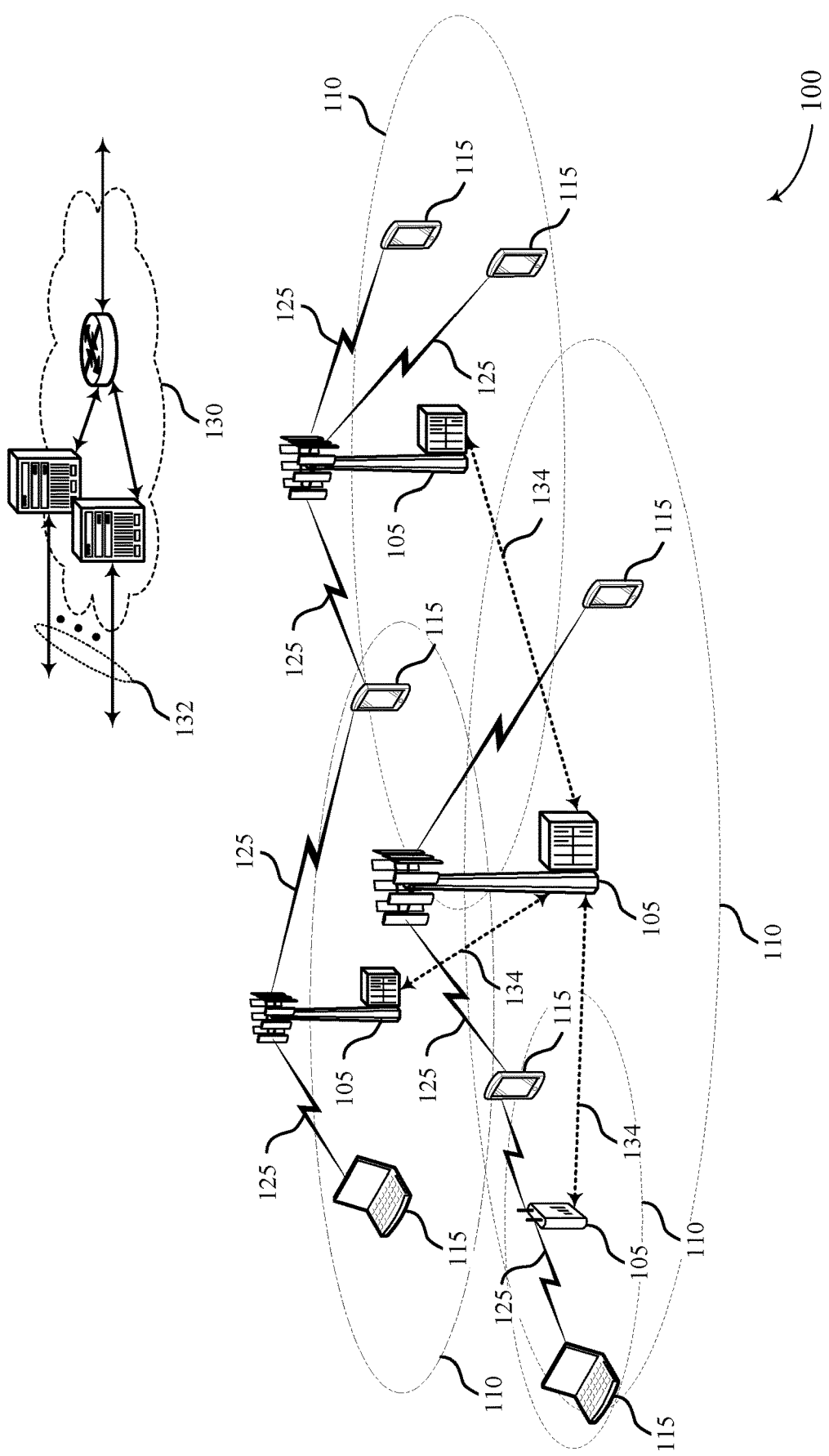
FIG. 1 illustrates an example of a system for wireless communications that supports uplink transmission cancellation in accordance with aspects of the present disclosure.

Some communication systems may support different traffic types (e.g., traffic categories), which may include or refer to communications traffic having different reliability thresholds, different latency thresholds, different services, or various combinations thereof. For example, a wireless communication system may support a first traffic type (e.g., communications type), associated with relatively high reliability targets or thresholds and relatively low latency targets or thresholds, such as ultra-reliable low-latency communications (URLLC) traffic type. The wireless communication system may also support a second traffic type, associated with relatively low reliability targets or thresholds and relatively long or relaxed latency thresholds, such as enhanced mobile broadband (eMBB) traffic type. In some cases, to support various system operations (e.g., efficient utilization of wireless communication resources, appropriate allocation or balancing of wireless communication resources, appropriate support of traffic according to different prioritization or latency threshold), a wireless communication system may support dynamic resource sharing between traffic types, such as a dynamic allocation of resources between URLLC communications and eMBB communications, or other communications, according to different traffic types, categories, or other prioritizations.

The described techniques include various examples of dynamic resource allocation by way of cancellation or preemption of previously-allocated uplink resources by a network entity, such as a base station or other controller or resource allocation authority in communication with a base station. For example, a base station, or other network entity, may allocate uplink resources (e.g., an initial uplink resource allocation) to UEs, or groups of UEs, and the base station may subsequently issue a cancellation or preemption indication (e.g., an uplink allocation cancellation indication) that may correspond to at least a portion of the previously-allocated uplink resources (e.g., as allocated to particular UEs). UEs may detect such a cancellation indication, and determine whether or not to proceed with an uplink transmission using their previously-allocated uplink resources.

In some examples, a cancellation indication may be used to prevent a UE from using at least a portion of previously-allocated uplink resources for an uplink transmission, which may support a dynamic allocation of uplink resources from communications associated with one latency threshold to communications associated with another latency threshold, or some other reallocation based on communications prioritization. For example, resources that were originally allocated to eMBB communications may be reallocated to URLLC communications (e.g., a reallocation towards more performance-sensitive communications). In some examples, a particular UE may ignore a cancellation indication, such as when a cancellation indication is meant to halt uplink transmissions from other UEs in order to reallocate the uplink resources to the particular UE, or to a type of traffic that is to be transmitted by the particular UE. Thus, according to these and other examples, various types of uplink resource allocations may be canceled, preempted, or reallocated, thereby supporting a dynamic redistribution of uplink resources in a wireless communication system that more-effectively balances the performance and resource utilization of communications according to different priorities.

Aspects of the disclosure are initially described in the context of a wireless communications system. Aspects of the disclosure are further illustrated by and described with reference to examples of signaling, operations, and resource mapping that may support the described techniques for uplink transmission cancellation. Aspects of the disclosure are further illustrated by and described with reference to apparatus diagrams, system diagrams, and flowcharts that relate to uplink transmission cancellation.

FIG. 1 illustrates an example of a wireless communications system 100 that supports uplink transmission cancellation in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may be a device such as a cellular phone, a smart phone, a personal digital assistant (PDA), a multimedia/entertainment device (e.g., a radio, a MP3 player, a video device, etc.), a camera, a gaming device, a navigation/positioning device (e.g., GNSS (global navigation satellite system) devices based on, for example, GPS (global positioning system), Beidou, GLONASS, or Galileo, a terrestrial-based device, etc.), a tablet computer, a laptop computer, a netbook, a smartbook, a personal computer, a smart device, a wearable device (e.g., a smart watch, smart clothing, smart glasses, virtual reality goggles, a smart wristband, smart jewelry (e.g., a smart ring, a smart bracelet)), a drone, a robot/robotic device, a vehicle, a vehicular device, a meter (e.g., parking meter, electric meter, gas meter, water meter), a monitor, a gas pump, an appliance (e.g., kitchen appliance, washing machine, dryer), a location tag, a medical/healthcare device, an implant, a sensor/actuator, a display, or any other suitable device configured to communicate via a wireless or wired medium. In some examples, a UE 115 may also refer to a wireless local loop (WLL) station, an Internet of Things (IoT) device, an Internet of Everything (IoE) device, or an MTC device, or the like, which may be implemented in various articles such as appliances, drones, robots, vehicles, meters, or the like Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. In an aspect, techniques disclosed herein may be applicable to MTC or IoT UEs. MTC or IoT UEs may include MTC/enhanced MTC (eMTC, also referred to as CAT-M, Cat M1) UEs, NB-IoT (also referred to as CAT NB1) UEs, as well as other types of UEs. eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA).

Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling.

A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and, in some examples, the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a wireless local area network (WLAN), such as a Wi-Fi (i.e., Institute of Electrical and Electronics Engineers (IEEE) 802.11) network may include an access point (AP) that may communicate with one or more wireless or mobile devices. The AP may be coupled to a network, such as the Internet, and may enable a mobile device to communicate via the network (or communicate with other devices coupled to the access point). A wireless device may communicate with a network device bi-directionally. For example, in a WLAN, a device may communicate with an associated AP via downlink (e.g., the communication link from the AP to the device) and uplink (e.g., the communication link from the device to the AP). A wireless personal area network (PAN), which may include a Bluetooth connection, may provide for short range wireless connections between two or more paired wireless devices. For example, wireless devices such as cellular phones may utilize wireless PAN communications to exchange information such as audio signals with wireless headsets. Components within a wireless communication system may be coupled (for example, operatively, communicatively, functionally, electronically, and/or electrically) to each other.

The wireless communications system 100 may be configured to support different traffic types (e.g., traffic categories, traffic priorities, service priorities), which may include or refer to communications traffic having different reliability thresholds, different latency thresholds, different services, or various combinations thereof. For example, the wireless communications system 100 may support a first traffic type (e.g., communications type), associated with relatively high reliability targets or thresholds and relatively low latency targets or thresholds, such as ultra-reliable low-latency communications (URLLC) traffic type. The wireless communications system 100 may also support a second traffic type, associated with relatively low reliability targets or thresholds and relatively long or relaxed latency thresholds, such as an enhanced mobile broadband (eMBB) traffic type. In some cases, to support various system operations (e.g., efficient utilization of wireless communication resources, appropriate allocation or balancing of wireless communication resources, appropriate support of traffic according to different prioritization or latency threshold), the wireless communications system 100 may support dynamic resource sharing between traffic types, such as a dynamic allocation of resources between URLLC communications and eMBB communications, or other communications, according to different traffic types, categories, or other prioritization.

To support various uplink resource allocation techniques, a base station 105 or other network entity (e.g., an entity of the core network 130, an entity of a distributed base station 105) may allocate uplink resources (e.g., an initial uplink resource allocation) to UEs 115, or groups of UEs 115, for uplink transmissions. In some examples, a base station 105 or other network entity may subsequently determine to perform a reallocation of the previously-allocated uplink resources, which may be triggered, for example, by a determined or detected need, demand, or request to support higher-priority communications. Thus, a base station 105 or other network entity may generate and transmit an uplink cancellation indication (ULCI) that may correspond to at least a portion of the previously-allocated uplink resources (e.g., as allocated to particular UEs 115). UEs 115 may be configured to monitor for ULCIs, and accordingly may determine, based at least in part on received, detected, or decoded ULCIs, whether or not to proceed with uplink transmissions using their previously-allocated uplink resources.

In some examples, ULCI may be used to prevent a UE 115 from using at least a portion of previously-allocated uplink resources for an uplink transmission, which may support a dynamic allocation of uplink resources from communications associated with one latency threshold to communications associated with another latency threshold, or some other reallocation based on communications prioritization.

For example, resources that were originally allocated to the UE 115 for eMBB communications (e.g., allocated to eMBB UEs, allocated to UEs 115 configured for eMBB communications) may be reallocated to the same UE 115, or a different UE 115, for URLLC communications (e.g., a reallocation towards more performance-sensitive communications). In some examples, a particular UE 115 may ignore a ULCI, such as when a ULCI is meant to halt uplink transmissions from other UEs 115 in order to reallocate the uplink resources to the particular UE 115, or to a type of traffic that is to be transmitted by the particular UE 115. Thus, according to these and other examples, various types of uplink resource allocations may be canceled, preempted, or reallocated, such that the wireless communications system 100 may support a more dynamic redistribution of uplink resources according to different priorities of communications.

Figure 2:
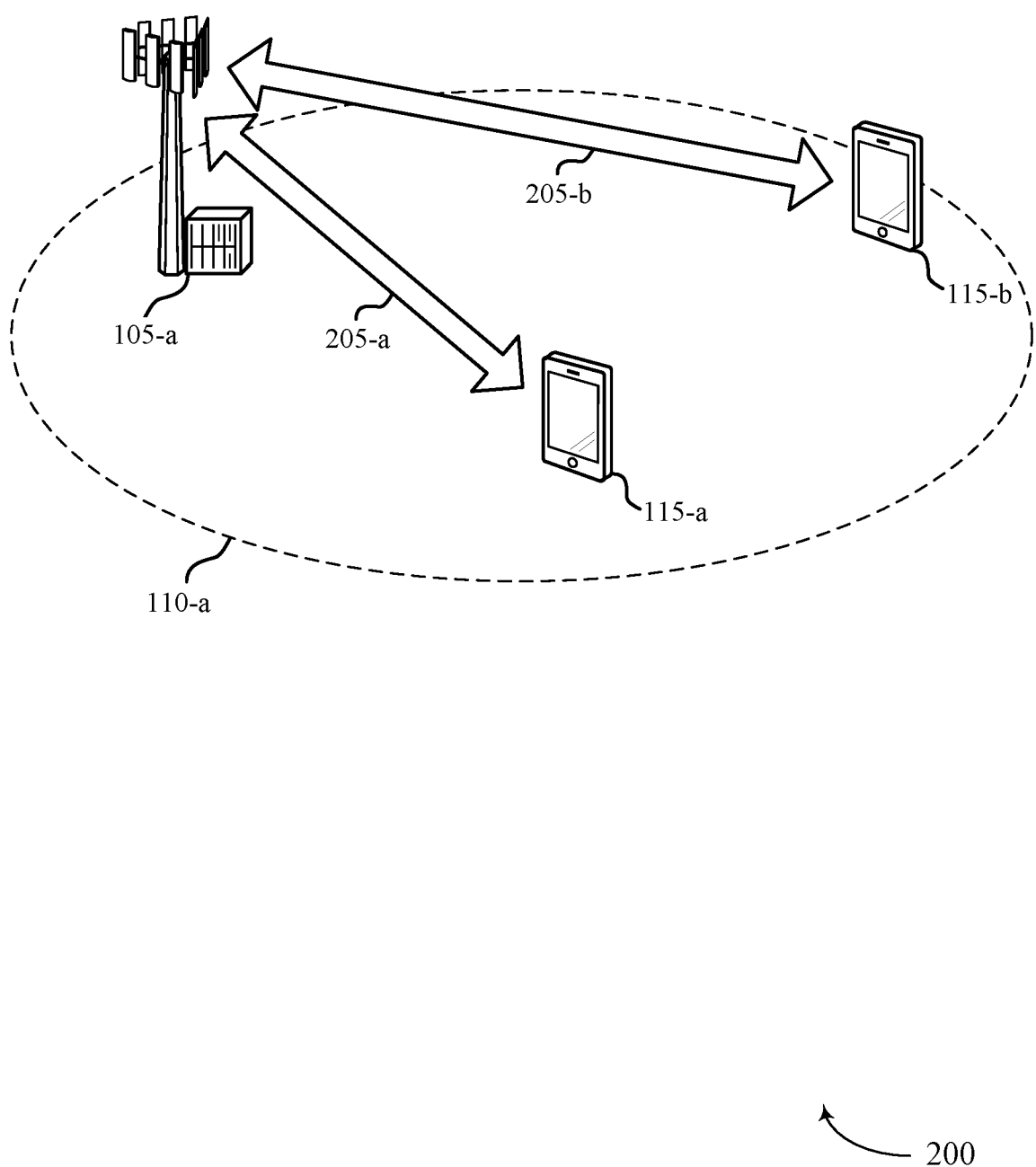
FIG. 2 illustrates an example of a system for wireless communications that supports uplink transmission cancellation in accordance with aspects of the present disclosure.

FIG. 2 illustrates an example of a wireless communications system 200 that supports uplink transmission cancellation in accordance with aspects of the present disclosure. The wireless communications system 200 may include a base station 105-a that supports communication with multiple UEs (e.g., UE 115-a and UE 115-b) within a supported geographic coverage area 110-a. In some examples, the communication may support mission critical applications that include stringent communication performance (e.g., reliability thresholds, latency thresholds) along with communications of other types. Wireless communications system 200 may implement aspects of wireless communications system 100, as described with reference to FIG. 1.

In the wireless communications system 200, UE 115-a and UE 115-b may support different service deployments, such as URLLC service and eMBB service. For example, the UE 115-a may support URLLC transmission to reduce end-to-end latency for data transmission and reception associated with the base station 105-a. In some examples, the UE 115-a may correspond to a URLLC UE that supports or is otherwise configured for transmissions, such as periodic transmissions, of relatively small data packets. For example, the UE 115-a may include a URLLC UE that supports operations and data communication associated with factory automation (e.g., automated manufacturing, supply chain management), transport (e.g., vehicle-to-vehicle (V2V) communications, vehicle-to-infrastructure (V2I) communications), or electrical power distribution (e.g., power grid networking) within a supported area or locale, among other possible implementations.

Additionally or alternatively, the UE 115-b may support eMBB transmissions associated with high data rates across wide coverage areas (such as geographic coverage area 110-a) supported by the base station 105-a. In some examples, compared to URLLC communications, eMBB communications may be associated with relatively relaxed (e.g., longer) latency targets or thresholds, lower reliability targets or thresholds, or both. Moreover, one or more of UE 115-a and UE 115-b may support data communications associated with multiple service deployments (such as URLLC and eMBB), as part of an intra-UE or inter-UE operation.

To support the conditions associated with the URLLC and eMBB service deployments, or other types of resource allocation based on communication prioritization, the base station 105-a and the UEs 115-a and 115-b may support various techniques for dynamic uplink resource allocations and uplink transmission cancellation or preemption. For example, the base station 105-a may be configured to transmit a ULCI based at least in part on determining a reallocation of uplink resources (e.g., associated with uplink resources allocated to one or both of the UE 115-a or 115-b), and the UEs 115-a and 115-b may monitor for such ULCIs to determine how they should proceed with uplink communications. In other words, the UEs 115 may be notified about canceled uplink resources in the time domain and frequency domain. In various examples, each of the UE 115-a or the UE 115-b may perform uplink communication determinations such as determining whether to perform or proceed with uplink transmissions using at least a portion of their previously-allocated uplink resources, or determining to refrain from using at least a portion of their previously-allocated uplink resources, or determining to await another allocation of uplink resources before initiating or resuming uplink communications, or other determinations.

ULCIs may be signaled by the base station 105-a to UEs 115 (e.g., one or both of the UEs 115-a or 115-b, a group of UEs) according to various techniques. For example, a UE 115 may be configured to monitor for ULCIs according to various signaling by the base station 105-a, such as various types of downlink control signaling, physical channel signaling, cell-specific signaling, and others. In some examples, ULCIs may be conveyed in downlink control information (DCI) over a physical downlink control channel (PDCCH), which may support UE-specific ULCIs. In some examples, a UE 115 may be configured (e.g., by the base station 105-a) with a radio network temporary identifier (RNTI) for monitoring a PDCCH that may be carrying ULCIs. In various examples, a UE 115 may be configured with an RNTI that is common between uplink and downlink cancellation or preemption indications, or different between uplink and downlink cancellation or preemption indications.

In some examples, ULCIs may be configured or conveyed in a group-common physical downlink control channel (GC-PDCCH) or otherwise conveyed in group-common DCI (GC-DCI), or DCI format 2_1, which may support signaling ULCIs that are relevant to sets of one or more UEs 115, and may reduce signaling overhead as compared to ULCIs that are conveyed in UE-specific signaling. In some examples, ULCIs, or GC-PDCCH or GC-DCI indications, may be configured for UEs 115 configured for particular communications, such as eMBB communications (e.g., configured for eMBB UEs).

In some examples, uplink cancellation may include various configurations by way of RRC configuration or other connection establishment between the base station 105-a and UEs 115. For example, such configurations may be signaled to UEs 115 (e.g., by the base station 105-a) in an information element (IE) or other configuration for uplink cancellation (e.g., an UplinkCancellation or UplinkPreemption IE, an int-RNTI configuration).

ULCIs may also be configured to be associated with a particular bandwidth in the frequency domain (e.g., a frequency carrier, a frequency channel, a bandwidth part, a set of one or more physical resource blocks (PRBs) in the frequency domain). In one example, UEs 115 may be configured according to uplink bandwidth parts, and a set of PRBs for a received ULCI may be equal to or otherwise correspond to an active uplink bandwidth part configured for the UE 115. In such examples, cancellation or preemption associated with ULCIs may correspond to an entire configured uplink bandwidth or uplink bandwidth part (e.g., uplink preemption without frequency-domain partitioning), or cancellation or preemption associated with ULCIs may correspond to certain portions of resources of a configured uplink bandwidth or uplink bandwidth part (e.g., uplink preemption with frequency-domain partitioning). Such divisions or partitioning may be referred to as a granularity of resources in the frequency domain for uplink cancellation.

ULCIs may also be configured to be associated with particular communication resources in the time domain, which may be configured by RRC configuration (e.g., by the base station 105-a) or other configuration. For example, resources in the time domain for which cancellation is applied (e.g., corresponding to a ULCI) may be indicated in symbol-level intervals (e.g., symbol durations, OFDM symbol durations), such as sets of 7-symbol durations or sets of 14-symbol durations, or may be indicated in sub-slots, such as 7 sub-slots each having a length of two symbol durations or four symbol durations. Such divisions or partitioning may be referred to as a granularity of resources in the time domain for cancellation, and, in some examples, such a granularity of resources in the time domain may be common between uplink cancellation or preemption and downlink cancellation or preemption.

In various examples, a granularity of time domain resources for uplink cancellation may depend on the granularity of frequency domain partitioning, or the granularity of resources in the time domain and the frequency domain may be otherwise interrelated. For example, for a given number of bits in a cancellation bitfield, when granularity of frequency domain partitioning is relatively finer, granularity of time domain partitioning may be relatively coarser. In one illustrative example, a first configuration may include time domain partitioning at a symbol level with no frequency domain partitioning, and a second configuration may include time domain partitioning at a subslot level with frequency domain partitioning (e.g., according to two divisions in the frequency domain). In various examples, cancellation may be indicated, for subsets of resources corresponding to a given ULCI, by bits of a bitfield included in the ULCI, which may be associated with more-flexible uplink cancellation, such as relatively greater options for resource puncturing patterns or relatively flexible quantities of canceled symbols than other techniques.

In some examples, the wireless communications system 200 may support more than one pattern of resources in ULCIs, such as supporting ULCIs with or without frequency-domain partitioning. The base station 105-a or other network entity may determine one of the patterns of resources for ULCIs, and signal a configuration to UEs 115 (e.g., via downlink control signaling, via RRC configuration) so the UEs 115 can properly interpret ULCIs received from the base station 105-a (e.g., according to the determined pattern). In one example, a UE 115 may support interpreting ULCIs (e.g., bitfields of a ULCI) according to two patterns of communication resources, and may be configured (e.g., by the base station 105-a) for one of the two patterns based on the value of a bitfield in a configuration register or DCI (e.g., a variable or IE timeFrequencySet). In an illustrative example, when the value of the bitfield is 0, the ULCI may be configured for or interpreted according to time-domain partitioning at a symbol level and without frequency domain partitioning, and when the value of the bitfield is 1, the ULCI may be configured for or interpreted according to time-domain partitioning at a sub-slot level and with frequency domain partitioning (e.g., dividing an active uplink bandwidth part into two subbands for the purpose of uplink cancellation).

In some examples, ULCIs may be configured for, or include an indication of various repetition techniques. For example, DCI corresponding to ULCIs may include a number of bits (e.g., 1 or 2 bits, a first two bits of a ULCI bitfield) indicating a number of repetitions corresponding to a particular ULCI (e.g., from the time it decodes a ULCI). In an illustrative example, for a two-bit repetition indication, a value of 00 may indicate 0 repetitions, a value of 01 may indicate one repetition, a value of 10 may indicate two repetitions, and a value of 11 may indicate three repetitions. In various examples repetition may be applied at a bit level or a string level. In other examples, a UE 115 may be more-generally configured to interpret or apply repetition to received ULCIs, which may reduce signaling overhead associated with repetition indications.

In an illustrative example, a UE 115 may be configured to identify or map a ULCI bitfield in group-common DCI (GC-DCI) as 100000111, and interpret the first two bits (e.g., 10) as a repetition indication that indicates two repetitions (e.g., assuming the UE 115 is configured with 7-bit ULCIs at a symbol level). Accordingly, the UE may apply the cancellation pattern indicated by the remaining bits (e.g., 0000111, a bitfield having a length of 7 bits) three times. When the UE is configured to apply bit-level repetition, the UE may interpret the pattern indicated by the ULCI bitfield as |000|000|000|000|111|111|111|, where the vertical bars are added for illustrative clarity to show that each bit is repeated three times before moving to the next remaining bit in the bitfield. When the UE is configured to apply string-level repetition, the UE may interpret the pattern indicated by the ULCI bitfield as |0000111|0000111|0000111|, where the vertical bars are added for illustrative clarity to show that the entire string of remaining bits is interpreted before the string of remaining bits is repeated again (e.g., according to the indicated two repetitions). Thus, in either case, the indicated repetition may support a UE identifying 21 resources of the ULCI that may or may not be subject to cancellation based on 7 bits of a bitfield. In various cases, the above scenarios may assume no frequency domain partitioning, or may include frequency domain partitioning. These and other techniques for indicating repetitions of uplink cancellation may be combined with configurations for granularity in the time domain and frequency domain (e.g., a particular set of resources corresponding to each of the bits in the bitstring), and other aspects of ULCIs.

In another example, the wireless communications system 200 may support a configuration or preconfiguration (e.g., at the base station 105, at the UEs 115) with a set of patterns for cancellation, including static configurations, semi-static configurations, configuration by a network entity (e.g., of a core network 130), and others. In such examples, the base station 105-a may select one of the configured set of patterns, and transmit an indication to UEs 115 identifying the selected pattern. UEs 115 may receive the indication, and accordingly process received ULCIs according to the indicated pattern when interpreting a received ULCI (e.g., to support determining whether the received ULCI applies to an allocation of uplink resources). In various examples, such configurations or preconfigurations may be specific to particular UEs 115, may be common to sets of UEs 115 (e.g., according to group-common signaling, according to UEs configured for a type of communications), or may be common to all UEs 115 served by a cell or base station 105.

In some examples, patterns may be defined according to a start and length indicator value (SLIV), or a SLIV table, which may refer to a starting symbol or other time for uplink cancellation and a length or duration for cancellation. In various examples, the number of rows of such a table may correspond to or otherwise be associated with a number of bits for signaling a particular row. For example, for a SLIV table with 16 rows, a SLIV indication signaling may be associated with 4 bits. In various examples, signaling of a such a cancellation resource pattern (e.g., a row of a SLIV table) may accompany a ULCI, or such signaling may precede a ULCI and the ULCI itself may signal when the indicated pattern should be considered or applied for cancellation (e.g., in a single bit or flag). In an illustrative example, the base station 105-a may configure a SLIV table for one or more UEs 115 (e.g., an eMBB UE, a UE configured for eMBB communications) that defines a set of SLIV patterns for cancellation, and a bitwidth of the ULCI may be determined based on this SLIV table. In some cases, signaling that indicates which of a set of preconfigured cancellation patterns should be applied in uplink cancellation may be associated with lower signaling overhead than other techniques, such as signaling an entire bitfield for a cancellation pattern with each ULCI.

Figure 3A:
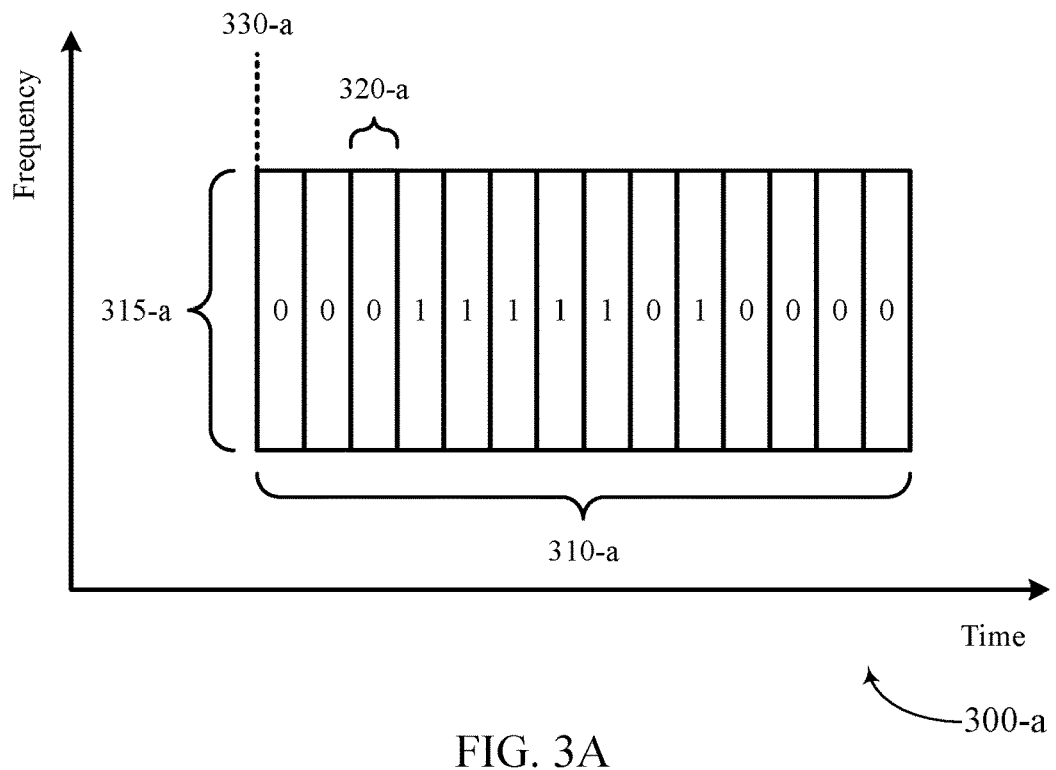
FIGS. 3A and 3B illustrate examples for mapping a bitfield of an uplink cancellation indication to communication resources for uplink transmission cancellation in accordance with the present disclosure.
Figure 3B:
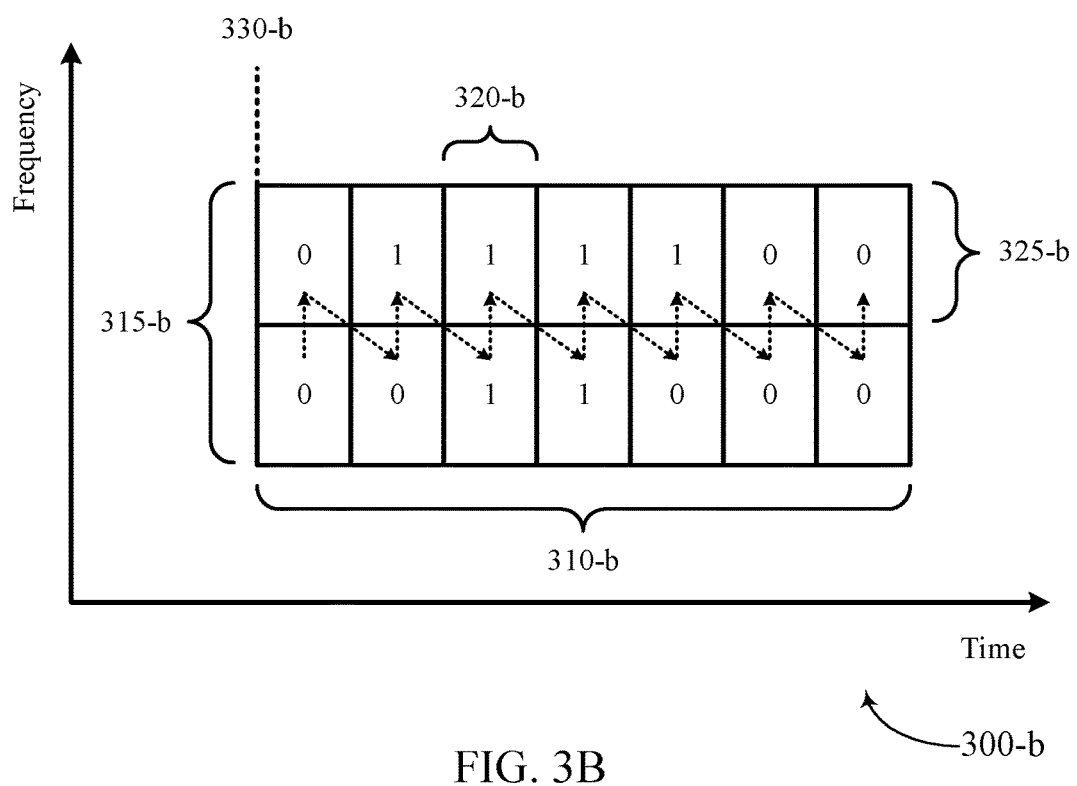

FIGS. 3A and 3B illustrate examples for mapping a bitfield of a ULCI to communication resources for uplink transmission cancellation in accordance with the present disclosure. For example, each of the mapping 300-a and the mapping 300-b illustrate examples for how a bitfield with a value of 00011111010000 (e.g., a bitmap having a length of 14 bits) may be mapped to resources in the time and frequency domain for uplink cancellation, where a value of '0' indicates that cancellation is not applied or enabled for the indicated resources (e.g., a frequency-time part), and a value of '1' indicates that cancellation is applied or enabled for the indicated resources. In other words, each of the mapping 300-a and the mapping 300-b illustrate examples of dividing time and frequency resources into 14 parts, mapped with 14 bits for uplink cancellation indications.

The mapping 300-a illustrates an example where frequency domain partitioning is not used or configured in a ULCI. For example, the bitfield may correspond to a duration 310-a in the time domain and a bandwidth 315-a in the frequency domain, where the duration 310-a may be equal to the cancellation indication periodicity. In some examples, the bandwidth 315-a may correspond to a configured uplink bandwidth part (e.g., for a UE 115, for a set of UEs 115). In one illustrative example, the bandwidth 315-a may be 10 MHz, but the described techniques may apply to other bandwidths 315-a. The mapping 300-a may be applied according to a start time 330-a, which, in some examples, may be measured or initiated based at least in part on a time that a particular ULCI is received (e.g., a ULCI symbol, a ULCI symbol duration) and a configured time offset. When the cancellation indication periodicity for the mapping 300-a is 2 slots (e.g., 28 symbols), each bit in the bitfield may correspond to a duration 320-a in the time domain equal to two symbols (e.g., two symbol durations). Thus, each bit may correspond to a subset of the communication resources corresponding to the mapping 300-a, where the subset refers to a single instance of communication resources having the duration 320-a and the bandwidth 315-a, following a sequential order in the time domain. When a bit in the bitfield has a value of 1, cancellation may apply across the entire bandwidth 315-a (e.g., across an entire configured uplink bandwidth part).

The mapping 300-b illustrates an example where frequency domain partitioning is used or configured in a ULCI. For example, the bitfield may correspond to a duration 310-b in the time domain and a bandwidth 315-b in the frequency domain, where the duration 310-b may be equal to the cancellation indication periodicity. In various examples, the duration 310-b and the bandwidth 315-b of the mapping 300-b may or may not be equal to the duration 310-a and the bandwidth 315-a of the mapping 300-a. For example, the bandwidth 315-b may also correspond to a configured uplink bandwidth part (e.g., for a UE 115, for a set of UEs 115). In one illustrative example, the bandwidth 315-b may also be 10 MHz, but the described techniques may apply to other bandwidths 315-b. The mapping 300-b may be applied according to a start time 330-b, which may also be measured or initiated based at least in part on a time that a particular ULCI is received and a configured time offset.

When the cancellation indication periodicity for the mapping 300-b is 2 slots (e.g., 28 symbols), each bit in the bitfield may correspond to a duration 320-b in the time domain of four symbols (e.g., four symbol durations). However, in the example of mapping 300-b, each bit in the bitfield may correspond to a fraction of the bandwidth 315-b, equal to the bandwidth 325-b. In other words, each bit may correspond to a subset of the communication resources corresponding to the mapping 300-b, where the subset refers to a single instance of communication resources having the duration 320-b and the bandwidth 325-b, following an order in a sawtooth pattern as shown. In other words, a first bit in a pair of bits for a symbol group may be applicable to a lower subset of the bandwidth 315-b (e.g., a lower subset of an active uplink bandwidth part) and a second bit in the pair of bits for a symbol group may be applicable to an upper subset of the bandwidth 315-b (e.g., an upper bandwidth 325-b, an upper subset of an active uplink bandwidth part). However, other patterns for interpreting a bitfield across the mapping 300-b may be used.

In some examples, a wireless communication system may support uplink cancellation according to either the mapping 300-a or the mapping 300-b. Thus, a base station 105 may select either the mapping 300-a or the mapping 300-b, and generate ULCIs accordingly. For UEs 115 to interpret the ULCIs correctly (e.g., so that UEs 115 and the base station 105 have the same understanding of time and frequency uplink resources that are being canceled), the base station 105 may signal which of the two mappings has been configured for ULCIs, which may refer to an indication of the granularity for time-frequency resources for uplink cancellation. In some examples, such an indication may be configured in DCI according to a value of a variable timeFrequencySet that is associated with uplink cancellation granularity. If the base station 105 has selected the mapping 300-a, the base station 105 may set the value of timeFrequencySet to 0, and if the base station 105 has selected the mapping 300-b, the base station 105 may set the value of timeFrequencySet to 1. In some examples, a wireless communication system may support uplink cancellation according to both the mapping 300-a and the mapping 300-b simultaneously, and may signal the configuration for respective subsets of ULCIs or UEs 115 configured to monitor respective subsets of ULCIs (e.g., according to monitoring resource sets, according to configured bandwidth parts).

Figure 4A:
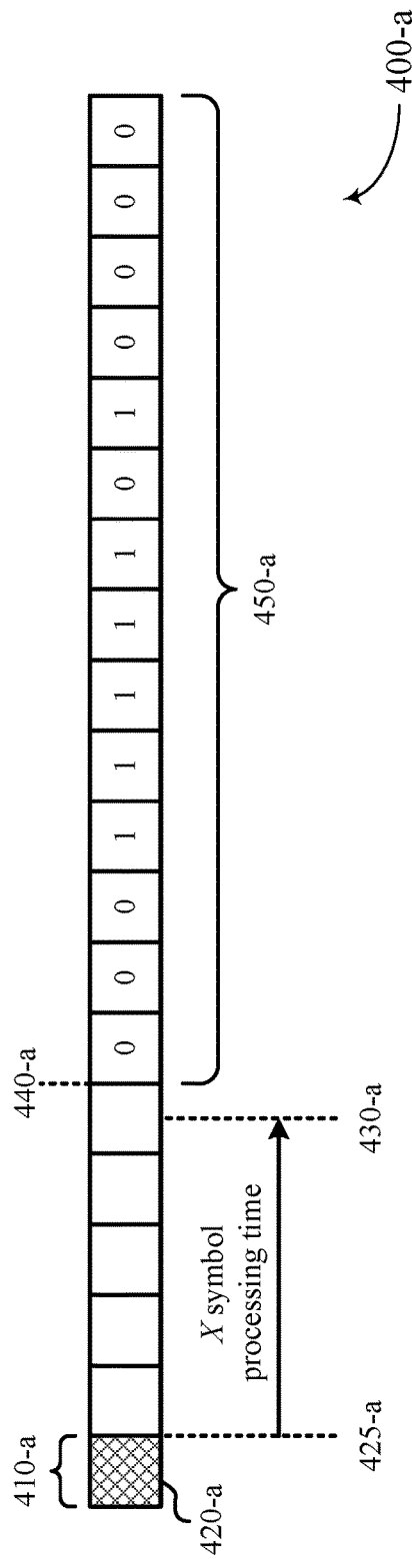
FIGS. 4A and 4B illustrate examples of processing timelines that supports uplink transmission cancellation in accordance with aspects of the present disclosure.
Figure 4B:
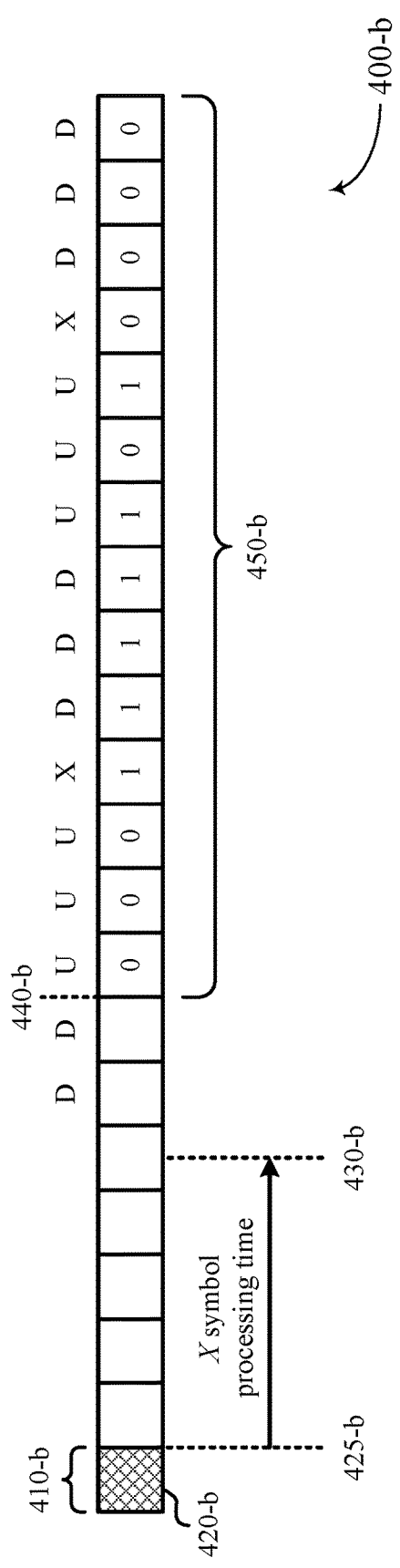

FIGS. 4A and 4B illustrate examples of processing timelines 400-a and 400-b that support uplink transmission cancellation in accordance with aspects of the present disclosure. The processing timelines 400-a and 400-b may illustrate aspects of communications performed by a wireless communications system 100 or 200, and may illustrate an example of applying the mapping 300-a, described with reference to FIG. 3A, for uplink cancellation, where the mapping 300-a is applied with symbol-level granularity in the time domain. The processing timelines 400-a and 400-b may illustrate a sequence of symbol durations 410, but the described techniques are also applicable to other durations. Further, although described in the context of the mapping 300-a, the described techniques may be applicable to other mapping, such as mapping 300-b, or other configured mapping such as a SLIV.

The processing timeline 400-a may begin with a ULCI symbol 420-a, indicative of a symbol or symbol duration in which a ULCI is received at a UE 115. In some examples, the ULCI symbol 420-a may be a last symbol of a CORE-SET where a UE 115 is configured to monitor PDCCH or GC-PDCCH for ULCIs. Like the mapping 300-a described with reference to FIG. 3A, the ULCI associated with the ULCI symbol 420-a may include a bitfield having a value of 0001111101000, where a value of 0 indicates that uplink cancellation is not applied for the indicated resources, and a value of 1 indicates that uplink cancellation is applied for the indicated resources.

The particular resources for which uplink cancellation is indicated by the bitfield may be based at least in part on a time at which a ULCI is received (e.g., the ULCI symbol 420-a, an uplink cancellation indication), and a time required to process and respond or react to the received ULCI. In the example of processing timeline 400-a, a reference time 425-a may be aligned in time with the end of the ULCI symbol 420-a. A time offset X may be applied or added to the reference time 425-a to identify a time 430-a, where the time offset X may be associated with an action time, a round trip time (RTT), a processing time, or other offset between receiving a ULCI and various processing operations. In some cases, the offset X may be UE-specific, or based on a UE capability. In some examples, the offset X may correspond to or be otherwise based on a time $N_2$, which may refer to a physical uplink shared channel (PUSCH) preparation time. For example, the UE processing time for ULCIs may be equal to, or shorter than the time $N_2$, or some other reference, preparation, or processing time (e.g., a PUSCH cancelation time). In the example of processing timeline 400-a, the time offset X may have a duration of 4.5 symbols. In other examples, the time offset X may have a duration of 5.5 symbols, or some other duration.

A base station 105 or a UE 115 may identify resources for uplink cancellation based on the time 430-a according to various techniques. In the example of processing timeline 400-a, the bitfield may be mapped to a first symbol following the time 430-a (e.g., a symbol starting at time 440-a), and across a set of symbols 450-a. In other words, in the example of processing timeline 400-a, the start time 330-a of the mapping 300-a may be aligned with the time 440-a of the processing timeline 400-a, and the duration 310-a of the mapping 300-a may correspond to the set of symbols 450-a. Thus, in the example of processing timeline 400-a, there may be five symbol durations 410-a between the end of the ULCI symbol 420-a and the start of uplink cancellation (e.g., time 440-a) corresponding to the ULCI symbol 420-a. In some examples, a UE 115 may refrain from transmitting on those uplink resources indicated to be canceled or preempted by the processing timeline 400-a (e.g., symbol durations having a value of "1"). In some examples, a cancellation determination by a UE 115 may be based on additional considerations, including those described with reference to the wireless communications system 500 described with reference to FIG. 5.

The processing timeline 400-b may illustrate another example for mapping indications of a ULCI to communications resources, where the mapping is based on an uplink/downlink TDD configuration, which may refer to a semi-static configuration between a base station 105 and a UE 115 (e.g., as indicated by a setting of TDD-UL-DL-ConfigurationCommon). Certain symbols of the processing timeline 400-b are indicated according to an example uplink/downlink TDD configuration, where "U" represents an uplink symbol, "D" represents a downlink symbol, and "X" represents a flexible symbol that may be dynamically configured as uplink or downlink.

The processing timeline 400-b may begin with a ULCI symbol 420-b, indicative of a symbol or symbol duration in which a ULCI is received at a UE 115, which may share characteristics of the ULCI symbol 420-a described with reference to FIG. 4A. In the example of processing timeline 400-b, a reference time 425-b may be aligned in time with the end of the ULCI symbol 420-b. A time offset X may be applied or added to the reference time 425-b to identify a time 430-b. In the example of processing timeline 400-b, the bitfield may be mapped to a first symbol configured for uplink (e.g., indicated with a "U") following the time 430-b (e.g., a symbol starting at time 440-b), and may span across a set of symbols 450-b. In other words, in the example of processing timeline 400-b, the start time 330-a of the mapping 300-a may be aligned with the time 440-b of the processing timeline 400-b, and the duration 310-a of the mapping 300-a may correspond to the set of symbols 450-b. Thus, in the example of processing timeline 400-b, there may be seven symbol durations 410-b between the end of the ULCI symbol 420-b and the start of uplink cancellation (e.g., time 440-b) corresponding to the ULCI symbol 420-b. However, such a set of durations may change depending on a particular TDD configuration of the base station 105 or the UE 115. Although the bitfield mapping of the processing timeline 400-b is described in the context of a first symbol configured for uplink following the time 430-b, in other examples, a bitfield may be mapped according to a first uplink or special symbol following the time 430-b (e.g., whichever comes sooner). In some examples, a UE 115 may refrain from transmitting on those uplink resources indicated to be canceled or preempted by the processing timeline 400-b (e.g., symbol durations having a value of "1"). In some examples, a cancellation determination by a UE 115 may be based on additional considerations, including those described with reference to the wireless communications system 500 described with reference to FIG. 5.

Although the processing timeline 400-b illustrates an example where, from a time 440, a bitfield is mapped to each of a set of consecutive symbol durations 410, other examples of a processing timeline 400 may not be mapped to consecutive symbol durations 410. In other words, the mapping of a bitfield for other processing timelines 400 (not shown) may have gaps according to certain techniques. For example, because a UE 115 may not expect that a ULCI bitmap would indicate uplink cancellation on symbols configured for downlink communications (e.g., according to a semi-static configuration, as indicated by TDD-UL-DL-ConfigurationCommon), the UE 115 may interpret the bitfield of a ULCI to instead be mapped only to those symbol durations that are configured as uplink symbol durations, or mapped only to those symbol durations that are configured as uplink or flexible symbol durations (e.g., skipping over those symbol durations that are configured as downlink symbol durations). Such techniques may reduce signaling overhead, since bits of a ULCI may not be wasted on indications for resources allocated to downlink transmissions.

Figure 5:
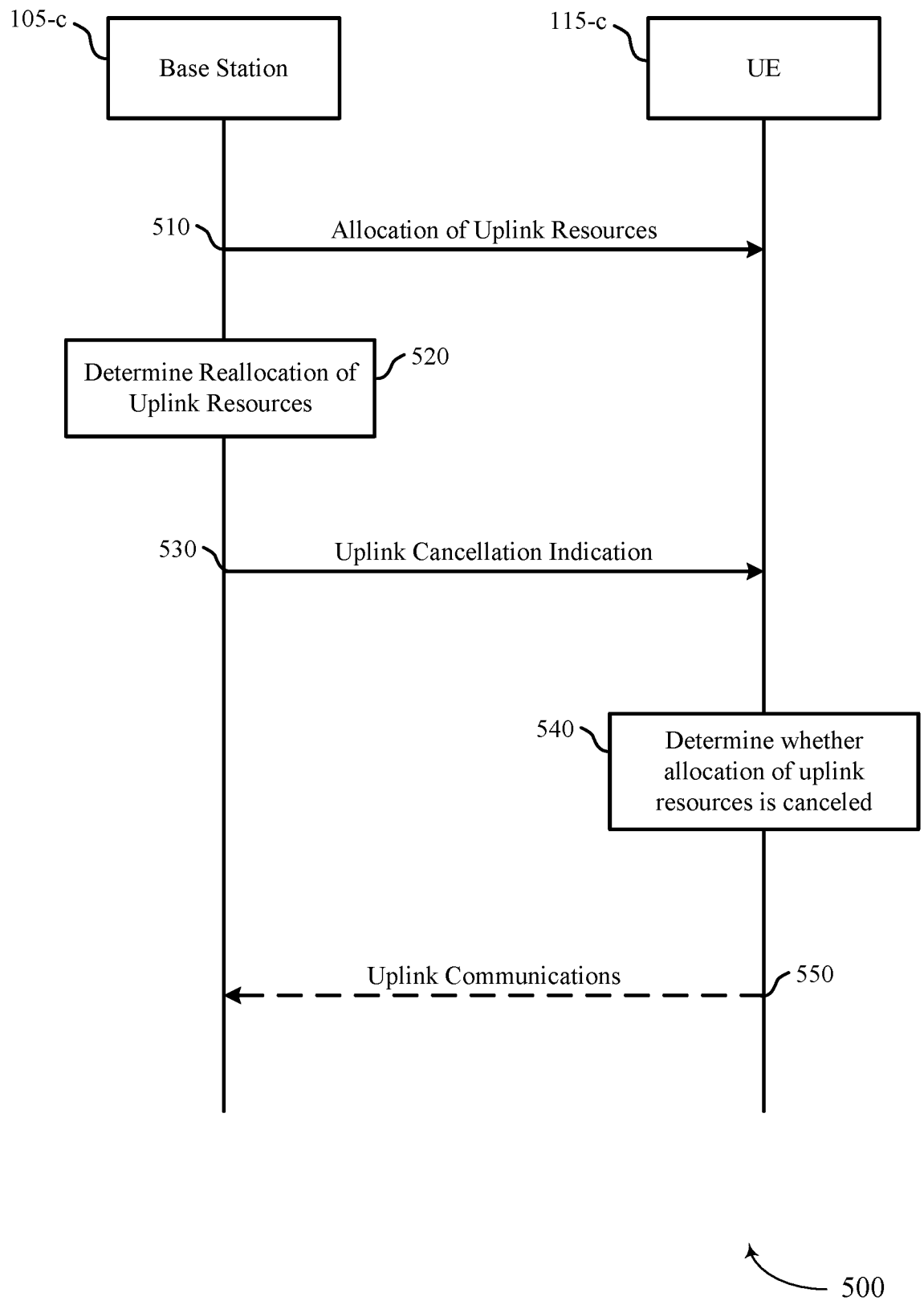
FIG. 5 illustrates an example of a wireless communications system and corresponding operations that support uplink transmission cancellation in accordance with aspects of the present disclosure.

FIG. 5 illustrates an example of a wireless communications system 500 and corresponding operations that support uplink transmission cancellation in accordance with aspects of the present disclosure. In some examples, the wireless communications system 500 may implement aspects of wireless communications systems 100 or 200 described with reference to FIGS. 1 and 2. The wireless communications system 500 includes a base station 105-c and a UE 115-c, which may be examples of base stations 105 and UEs 115 described herein.

At 510, the base station 105-c may signal an allocation of uplink resources, which may be received by the UE 115-c At 520, the base station 105-c may determine a reallocation of resources. In some examples, the reallocation at 520 may be related to supporting a particular type or category of communications, or supporting particular UEs 115 configured for a particular type or category of communications (e.g., URLLC communications, URLLC UEs). In some examples, determining the reallocation may be based at least in part on a configured time offset, such as a processing time offset, which may be based at least in part on a capability of the UE 115-c.

At 530, the base station 105-c may signal a ULCI, which may be received by the UE 115-c. In various examples, the ULCI may be UE-specific, or common to a set of one or more UEs 115. For example, the ULCI may be signaled using a GC-PDCCH transmission or other DCI or GC-DCI.

At 540, the UE 115-c may determine whether the allocation of resources (e.g., as signaled at 510) is canceled. For example, the UE 115-c may identify a bitmap of the ULCI associated with a set of communication resources in the time domain and frequency domain, and determine whether at least a portion of the allocation of uplink resources corresponds to one or more of the subsets of the communication resources for which cancellation applies. In various examples, determining whether the allocation of uplink resources is canceled may be based at least in part on a type of physical channel associated with uplink communications, a type of physical channel associated with the uplink cancellation indication, an allocation type associated with the identified allocation of uplink resources, a type or priority of communications associated with the ULCI, or a type or priority of subsequent uplink communications.

In some examples, ULCIs may have various dependence on or relationships with dynamic grants, such as uplink grants received over DCI, including the relationships and scenarios described herein. In other words, in some examples, determinations of uplink cancellation at 540 may be based at least in part on various scenarios for dynamic grants (e.g., based at least in part on a dynamic or DCI allocation category or type).

In one example, a later DCI scheduling of an uplink transmission (e.g., for URLLC communications, for higher-priority communications) may overwrite the cancellation of the ULCI received at 530. In other words, the UE 115-c may receive the ULCI at 530, but may also receive a dynamic uplink grant (e.g., for resources corresponding to or otherwise indicated by the ULCI) that causes the UE 115-c to ignore the ULCI of 530. For example, when the ULCI of 530 indicates that symbols 10-13 in a slot are canceled or preempted (e.g., for URLLC transmission), the UE 115-c may receive a DCI scheduling of URLLC PUSCH on symbols 12-13, and accordingly transmit an uplink transmission (e.g., a PUSCH transmission) on symbols 12-13. Thus, despite resources being indicated as canceled or preempted by the ULCI received at 530, the UE 115-c may still transmit an uplink transmission on those resources, such that the UE 115-c effectively ignores the ULCI of 530. In some examples, the ULCI 530 may be configured (e.g., by the base station 105-c) to clear lower-priority transmissions, at least in part to support the URLLC PUSCH transmission of the UE 115-c (e.g., on symbols 12-13).

In another example, the UE 115-c may not expect to receive a DCI grant allocating resources for uplink transmission for eMBB within symbols indicated to be canceled or preempted by ULCI. Rather, because the UE 115-c recognizes the ULCI of 530 as preempting eMBB communications (e.g., based on a type of communications corresponding to the ULCI), the UE 115-c may ignore such a subsequent DCI grant for eMBB communications (e.g., as an error condition). In other words, when the UE 115-c decodes a ULCI corresponding to a particular type or priority of communications, the UE 115-c may ignore subsequent uplink grants associated with the same particular type or priority of communications that would conflict with resources canceled or preempted by the ULCI of 530.

In another example, the UE 115-c may not expect to receive, in the same monitoring occasion, an uplink grant for eMBB transmission and an ULCI that would puncture or otherwise cancel or preempt the eMBB transmission. Rather, because the base station 105-c should not schedule the UE 115-c for communications that would need to be separately punctured or preempted by the ULCI of 530, the UE 115-c may ignore such a grant for eMBB transmission (e.g., as an error condition). In other words, when the UE 115-c decodes a ULCI that would puncture allocated communications (e.g., of a same communications type or category) in the same monitoring occasion, the UE 115-c may ignore the uplink grants that would be punctured by the ULCI of 530.

In another example, the UE 115-c may receive, in the same monitoring occasion, an uplink grant (e.g., a DCI grant) for URLLC transmission and an ULCI for eMBB cancellation. In this case, the UE 115-c will ignore the ULCI for those resources that URLLC DCI grants. In other words, more generally, when the UE 115-c decodes a ULCI of 530 that is associated with lower-priority communications than an uplink grant or other allocation of uplink resources, the UE 115-c may ignore the at least a portion of the ULCI of 530. In such examples, the ULCI 530 may be configured (e.g., by the base station 105-c) to clear lower-priority transmissions, at least in part to support the uplink grant for URLLC transmission of the UE 115-c.

In some examples, eMBB grants may be allowed to overwrite a ULCI of 530. For example, the UE 115-c may be configured to ignore a ULCI of 530 when the UE 115-c is configured to transmit a physical uplink control channel (PUCCH) carrying acknowledgement signaling (e.g., ACK/NACK for eMBB communications), or configured to transmit a PRACH that is triggered by PDCCH (e.g., PDCCH-ordered PRACH transmission).

In some examples, the base station 105-c or the UE 115-c may interpret or evaluate uplink cancellation of random access transmissions (e.g., PRACH transmissions) according to various conditions related to random access signaling or requests, or conditions associated with a connection with the base station 105-c (e.g., based on conditions for which a PRACH transmission is triggered). For example, various events may trigger PRACH transmissions by the UE 115-c, such as an initial access following an idle state (e.g., according to RRC IDLE), a connection reestablishment (e.g., according to an RRC connection re-establishment procedure), data arrival during a connected state when the UE 115-c and the base station 105-c are not synchronized (e.g., downlink or uplink data arrival during an RRC CONNECTED state when an uplink synchronization status is "non-synchronised"), data arrival during a connected state when resources for scheduling requests are unavailable (e.g., uplink data arrival during an RRC CONNECTED state when there are no PUCCH resources available for scheduling requests), scheduling request failures, handover requests (e.g., a request by a radio resource controller upon synchronous reconfiguration), a transition from an inactive state (e.g., an RRC INACTIVE state), to establish time alignment for an addition of a secondary cell, beam failure recovery, a request for other system information, or various other conditions.

Depending on how the random access transmissions for the UE 115-c are triggered, the UE 115-c may or may not be able to apply, or be expected to apply cancellation or preemption indications of a ULCI of 530. For example, during an initial access (e.g., from an idle state, upon connection establishment), the identity of the UE 115-c may not be known to the base station 105-c, and thus the base station 105-c may not have enough information to preempt or cancel PRACH transmissions by the UE 115-c. In another example, a downlink connection from the base station 105-c to the UE 115-c may be unreliable during a PRACH procedure, and accordingly the UE 115-c may not be able to successfully receive or decode a ULCI of 530. Accordingly, the base station 105-c may not be able to assume that PRACH transmissions of the UE 115-c would be successfully preempted or canceled (e.g., by a ULCI of 350). In other examples, such as events where PRACH transmissions are triggered by the base station 105-c (e.g., due to an uplink connection with the UE 115-c being non-synchronized, when a downlink connection remains reliable, according to PDCCH-ordered PRACH), the base station 105-c may be able to assume that PRACH transmissions would be successfully preempted or canceled. Thus, in some circumstances, the base station 105-a may proceed with a reallocation of uplink resource at 520, and a transmission of a ULCI at 530, based on triggering conditions associated with random access transmissions (e.g., PRACH transmissions).

In another example related to random access transmission triggering, the UE 115-c may not expect to receive (e.g., in a same monitoring occasion) signaling to trigger a random access transmission by the UE 115-c (e.g., a PDCCH-ordered PRACH) and a ULCI that would puncture or otherwise cancel or preempt the random access transmission. Rather, because the base station 105-c should not schedule the UE 115-c for random access transmissions that would need to be separately punctured or canceled by the ULCI of 530, the UE 115-c may ignore such a trigger for a random access transmission (e.g., as an error condition). In other words, when the UE 115-c decodes a ULCI that would cancel a triggered random access transmission (e.g., in the same monitoring occasion), the UE 115-c may ignore the trigger for the random access transmission.

In some examples, the UE 115-c may be configured to monitor ULCI after (e.g., based at least in part on) being scheduled for dynamic eMBB PUSCH transmission, or other transmissions that may be preempted by ULCIs. Additionally or alternatively, if the UE 115-c is not scheduled for eMBB transmission (e.g., eMBB PUSCH) or other transmissions that may be preempted by ULCIs, the UE 115-c may not need to monitor for cancellation, and accordingly may be configured to avoid or refrain from such monitoring, which may reduce power consumption or processor utilization at the UE 115-c. In some examples, the UE 115-c may be configured to monitor for uplink cancellation of other transmissions, such as after being triggered for asynchronous SRS (A-SRS).

In some examples, ULCIs may have various dependence on or relationships with higher-layer configured transmissions or configured grants, including the relationships and scenarios described herein. In other words, in some examples, determinations of uplink cancellation at 540 may be based at least in part on various scenarios for higher-layer configured transmissions (e.g., based at least in part on a higher-layer allocation category or type).

In one example, if the UE 115-c is configured by higher layers to transmit PUCCH, or PUSCH, or PRACH in the set of symbols of the slot, and the UE 115-c receives ULCI indicating that some of the resources within the set of symbols (e.g., for eMBB transmission) are preempted, then the UE 115-c may not transmit the configured PUCCH, or the PUSCH, or the PRACH in the slot. In other words, in contrast with dynamic grants received over DCI, in some examples, when a ULCI indicates a cancellation of uplink resources corresponding to higher-layer configured transmissions or configured grants (e.g., corresponding to PUCCH, PUSCH, or PRACH transmissions), the UE 115-c may not be configured to ignore the ULCI of 530.

In another example, if the UE 115-c is configured by higher layers to transmit a sounding reference signal (SRS) in the set of symbols of the slot, and the UE 115-c receives the ULCI of 530 indicating that at least some of the set of symbols are being preempted, the UE 115-c may transmit the SRS only in a subset of symbols from the set of symbols of the slot that are not being impacted by the ULCI (e.g., symbols that are not indicated for cancellation). However, in such examples, such a configuration may not imply that the UE 115-c with higher layer configured transmission is required to monitor for ULCIs. For example, ULCI may have been monitored and received after the UE 115-c was scheduled for dynamic PUSCH transmission (e.g., according to an allocation of uplink resources at 510).

In some examples, the UE 115-c may be configured to drop or not drop higher-layer configured transmissions, which may be a configuration specific to certain types of physical channels.

Additionally or alternatively, the UE 115-c may be configured with multiple configurations for ULCI targeted for different channels (e.g., different physical channels). In other words, ULCIs such as those received at 530 may be configured differently for different channels. For example, the UE 115-c may be configured according to different monitoring periodicity for higher-layer configuration as compared with ULCI monitoring for dynamic uplink grants (e.g., dynamic grants for PUSCH). In one example, the UE 115-c may be configured for periodic SRS transmissions according to an SRS periodicity, and the UE 115-c may be configured for cancellation monitoring according to a periodicity that matches the SRS periodicity. In other examples, ULCIs may have different monitoring periodicities or resource granularities depending on a type of channel, or type of communications, or other communication configuration of characteristic. In another example, for some higher layer configured transmissions (e.g., one or more of PUCCH or PRACH transmissions), the UE 115-c may be configured to ignore ULCIs, and proceed with transmissions of the higher-layer configured transmissions whether or not a ULCI was received at 530.

In some examples, at 550, the UE 115-c may perform uplink communications based at least in part on the outcome of 540, including transmissions according to the scenarios described above. For example, the UE 115-c may transmit an uplink transmission on a subset of the allocation of uplink resources based on the outcome of 540, or the UE 115-c may refrain from using at least a portion of the allocation of uplink resources based on the outcome of 540. In some examples, the UE 115-*c* may refrain from using the allocation of uplink resources entirely, and instead may wait for another allocation of resources prior to performing uplink communications.

Figure 6:
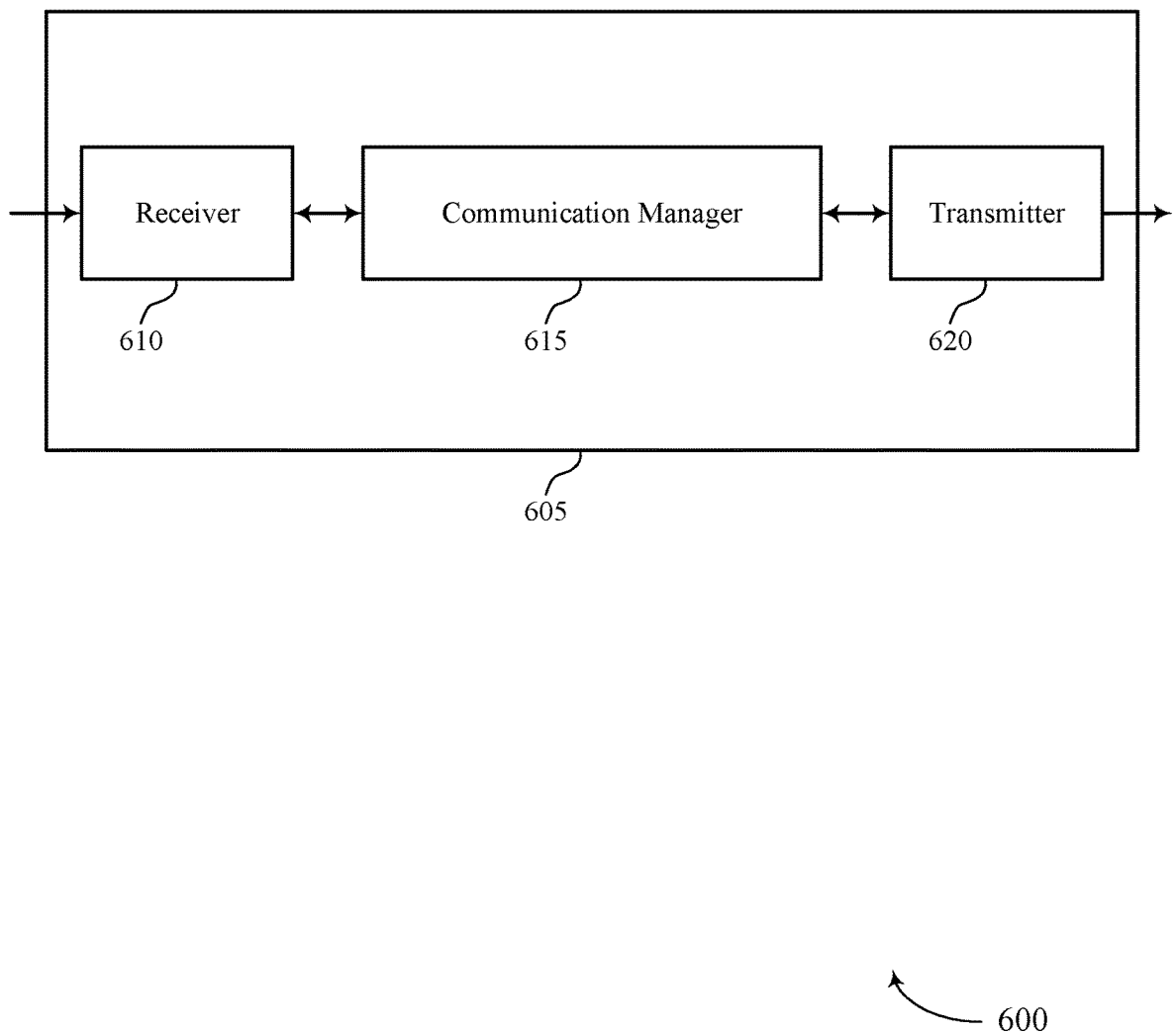
FIGS. 6 and 7 show block diagrams of devices that support uplink transmission cancellation in accordance with aspects of the present disclosure.

FIG. 6 shows a block diagram 600 of a device 605 that supports uplink transmission cancellation in accordance with aspects of the present disclosure. The device 605 may be an example of aspects of a UE 115 as described herein. The device 605 may include a receiver 610, a communication manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to uplink transmission cancellation, etc.). Information may be passed on to other components of the device 605. The receiver 610 may be an example of aspects of the transceiver 915 described with reference to FIG. 9. The receiver 610 may utilize a single antenna or a set of antennas.

The communication manager 615 may identify an allocation of uplink resources associated with a first type of communications with a first latency threshold, receive an uplink cancellation indication associated with a second type of communications with a second latency threshold that is different from the first latency threshold, determine whether the identified allocation of uplink resources is canceled based on the uplink cancellation indication, and perform uplink communications of either the first type of communications or the second type of communications based on the determining. The communication manager 615 may be an example of aspects of the communication manager 910 described herein.

The communication manager 615, or its sub-components, may be implemented in hardware, software (e.g., executed by a processor), or any combination thereof. If implemented in code executed by a processor, the functions of the communication manager 615, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communication manager 615, or its sub-components, may be physically located at various positions, including being distributed such that portions of functions are implemented at different physical locations by one or more physical components. In some examples, the communication manager 615, or its sub-components, may be a separate and distinct component in accordance with various aspects of the present disclosure. In some examples, the communication manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 915 described with reference to FIG. 9. The transmitter 620 may utilize a single antenna or a set of antennas.

Figure 7:
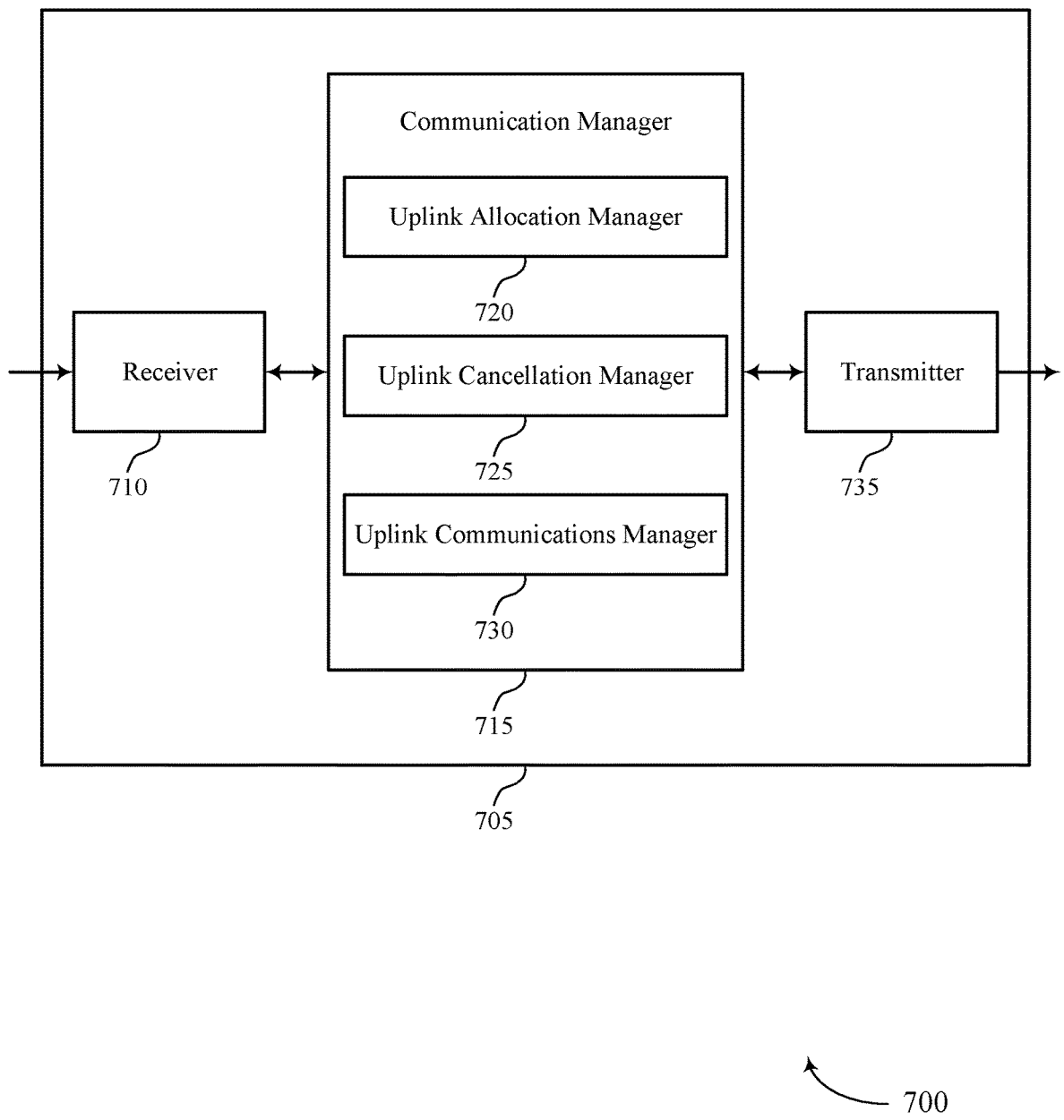

FIG. 7 shows a block diagram 700 of a device 705 that supports uplink transmission cancellation in accordance with aspects of the present disclosure. The device 705 may be an example of aspects of a device 605, or a UE 115 as described herein. The device 705 may include a receiver 710, a communication manager 715, and a transmitter 735. The device 705 may also include a processor. Each of these components may be in communication with one another (e.g., via one or more buses).

The receiver 710 may receive information such as packets, user data, or control information associated with various information channels (e.g., control channels, data channels, and information related to uplink transmission cancellation, etc.). Information may be passed on to other components of the device 705. The receiver 710 may be an example of aspects of the transceiver 915 described with reference to FIG. 9. The receiver 710 may utilize a single antenna or a set of antennas.

The communication manager 715 may be an example of aspects of the communication manager 615 as described herein. The communication manager 715 may include an uplink allocation manager 720, an uplink cancellation manager 725, and an uplink communications manager 730. The communication manager 715 may be an example of aspects of the communication manager 910 described herein.

The uplink allocation manager 720 may identify an allocation of uplink resources associated with a first type of communications with a first latency threshold.

The uplink cancellation manager 725 may receive an uplink cancellation indication associated with a second type of communications with a second latency threshold that is different from the first latency threshold and determine whether the identified allocation of uplink resources is canceled based on the uplink cancellation indication.

The uplink communications manager 730 may perform uplink communications of either the first type of communications or the second type of communications based on the determining.

The transmitter 735 may transmit signals generated by other components of the device 705. In some examples, the transmitter 735 may be collocated with a receiver 710 in a transceiver module. For example, the transmitter 735 may be an example of aspects of the transceiver 915 described with reference to FIG. 9. The transmitter 735 may utilize a single antenna or a set of antennas.

Figure 8:
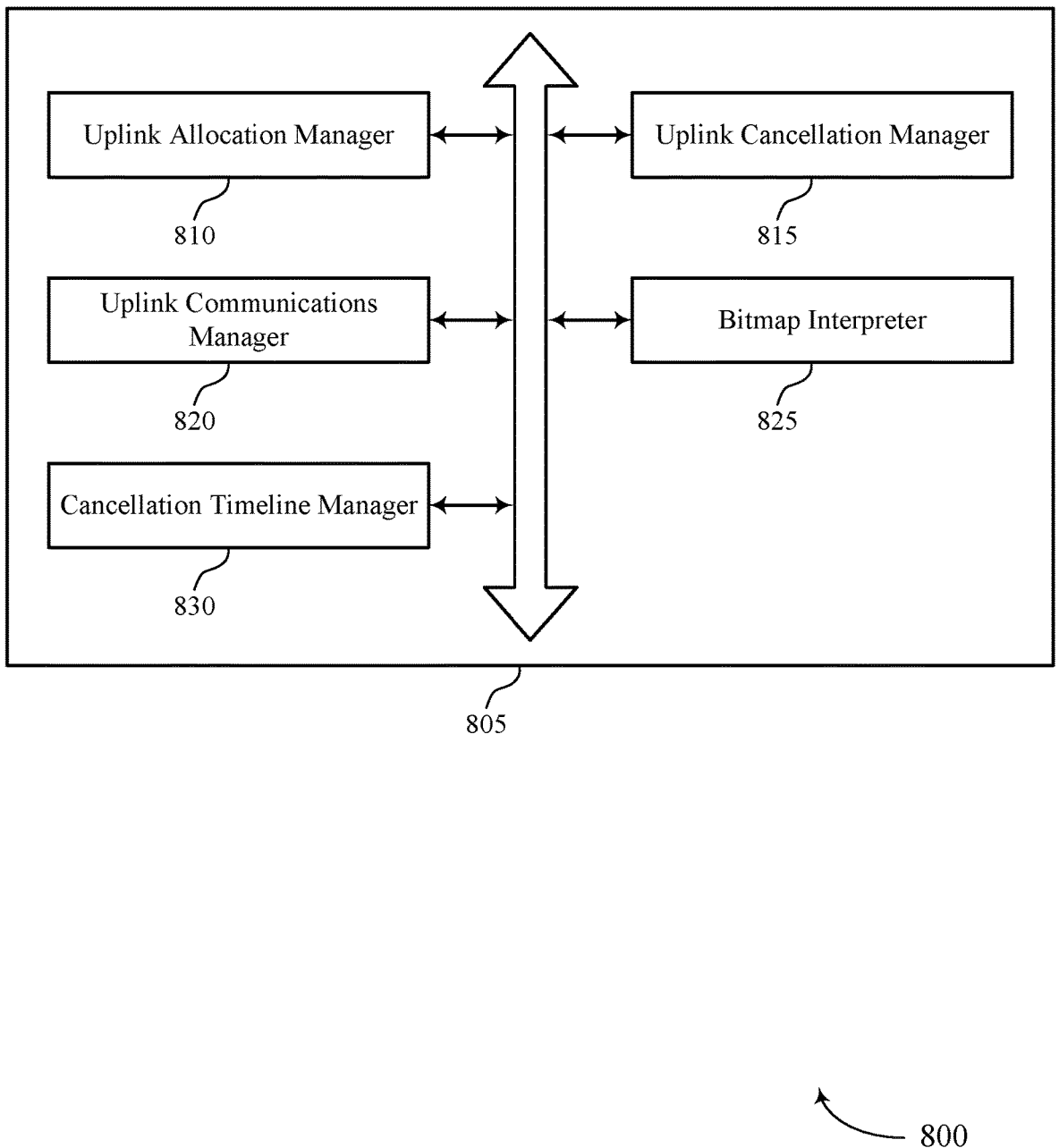
FIG. 8 shows a block diagram of a communication manager that supports uplink transmission cancellation in accordance with aspects of the present disclosure.

FIG. 8 shows a block diagram 800 of a communication manager 805 that supports uplink transmission cancellation in accordance with aspects of the present disclosure. The communication manager 805 may be an example of aspects of a communication manager 615, a communication manager 715, or a communication manager 910 described herein. The communication manager 805 may include an uplink allocation manager 810, an uplink cancellation manager 815, an uplink communications manager 820, a bitmap interpreter 825, and a cancellation timeline manager 830. Each of these modules may communicate, directly or indirectly, with one another (e.g., via one or more buses).

The uplink allocation manager 810 may identify an allocation of uplink resources associated with a first type of communications with a first latency threshold.

In some examples, the uplink allocation manager 810 may receive an uplink grant after receiving the uplink cancellation indication, the uplink grant including communication resources associated with the uplink cancellation indication.

The uplink cancellation manager 815 may receive an uplink cancellation indication associated with a second type of communications with a second latency threshold that is different from the first latency threshold.

In some examples, the uplink cancellation manager 815 may determine whether the identified allocation of uplink resources is canceled based on the uplink cancellation indication.

In some examples, the uplink cancellation manager 815 may determine whether at least a portion of the allocation of uplink resources corresponds to one or more of the subsets of the communication resources for which cancellation applies.

In some examples, the uplink cancellation manager 815 may determine that the respective subset of the communication resources corresponding to each bit of the bitmap corresponds to uplink resources of an uplink/downlink time division duplex (TDD) configuration of the UE.

In some examples, the uplink cancellation manager 815 may receive a cancellation configuration, prior to receiving the uplink cancellation indication, associated with a pattern of communication resources in the time domain and frequency domain, where the uplink cancellation indication indicates a time for applying the pattern of communication resources for cancellation.

In some examples, the uplink cancellation manager 815 may ignore at least a portion of the uplink cancellation indication based on receiving the uplink grant after receiving the uplink cancellation indication.

In some cases, the cancellation configuration includes a RRC configuration.

The uplink communications manager 820 may perform uplink communications of either the first type of communications or the second type of communications based on the determining.

In some examples, the uplink communications manager 820 may transmit an uplink transmission on a subset of the allocation of uplink resources based on the determining.

In some examples, the uplink communications manager 820 may refrain from using at least a portion of the allocation of uplink resources based on the determining.

In some cases, the first type of communications includes enhanced mobile broadband (eMBB) communications and the second type of communications includes ultra-reliable low latency communications (URLLC).

The bitmap interpreter 825 may identify a bitmap of the uplink cancellation indication associated with a set of communication resources in the time domain and frequency domain, each bit of the bitmap corresponding to a respective subset of the communication resources, and each bit indicating whether or not cancellation applies to the respective subset of the communication resources.

In some examples, the bitmap interpreter 825 may determine that the bitmap corresponds to an uplink bandwidth part configured for the UE.

In some examples, the bitmap interpreter 825 may identify a repetition indicator.

In some examples, the bitmap interpreter 825 may repeat bits of the bitmap according to the repetition indicator, each repeated bit of the bitmap corresponding to a respective subset of the communication resources, and each repeated bit indicating whether or not cancellation applies to the respective subset of the communication resources.

The cancellation timeline manager 830 may determine a time for applying cancellation based on a time of receiving the uplink cancellation indication and a configured time offset for cancellation.

Figure 9:
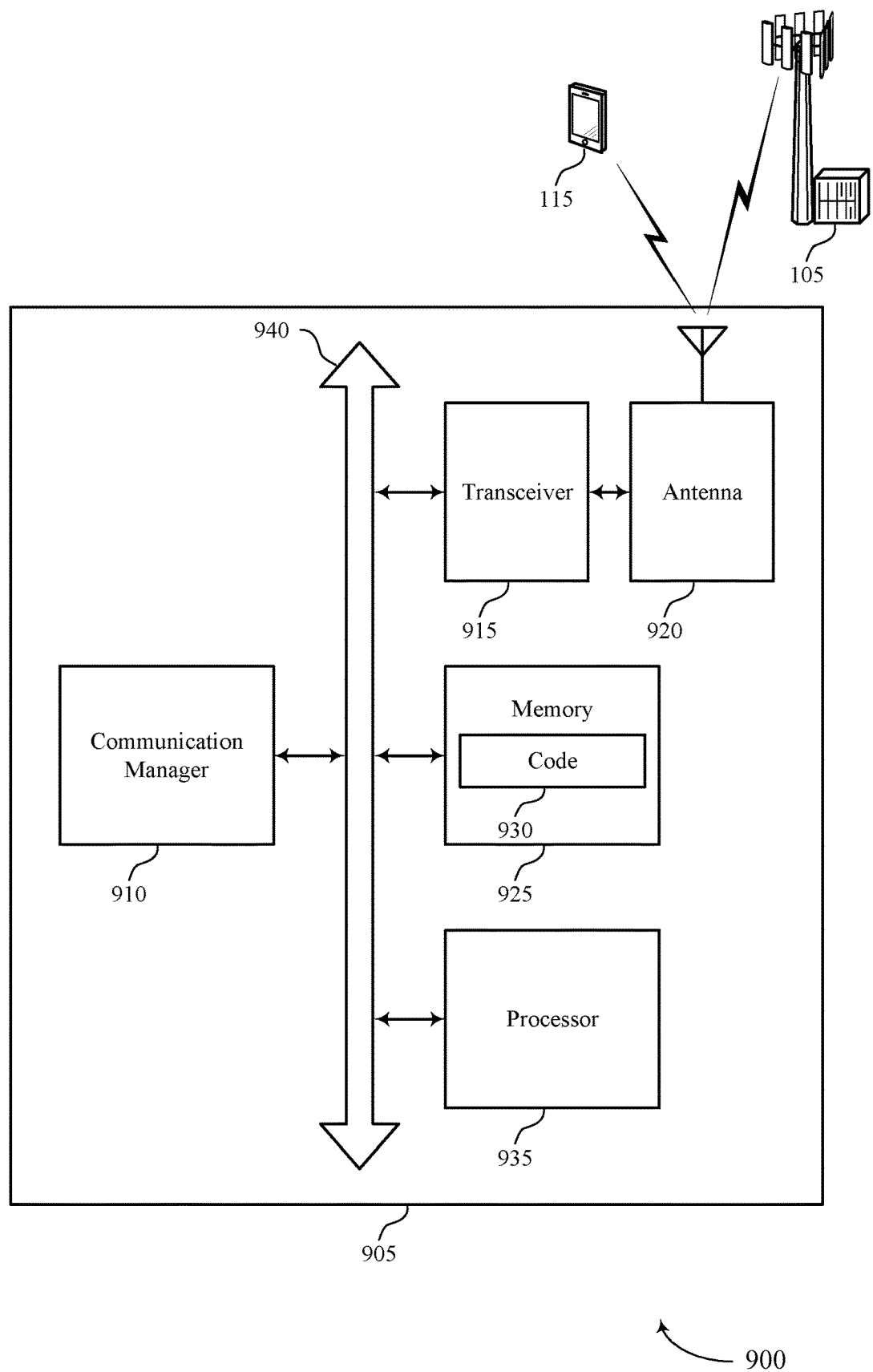
FIG. 9 shows a diagram of a system including a device that supports uplink transmission cancellation in accordance with aspects of the present disclosure.

FIG. 9 shows a diagram of a system 900 including a device 905 that supports uplink transmission cancellation in accordance with aspects of the present disclosure. The device 905 may be an example of or include the components of device 605, device 705, or a UE 115 as described herein. The device 905 may include components for bi-directional voice and data communications including components for transmitting and receiving communications, including a communication manager 910, a transceiver 915, an antenna 920, memory 925, and a processor 935. These components may be in electronic communication via one or more buses (e.g., bus 940).

The communication manager 910 may identify an allocation of uplink resources associated with a first type of communications with a first latency threshold, receive an uplink cancellation indication associated with a second type of communications with a second latency threshold that is different from the first latency threshold, determine whether the identified allocation of uplink resources is canceled based on the uplink cancellation indication, and perform uplink communications of either the first type of communications or the second type of communications based on the determining.

The actions performed by the communication manager 910 as described herein may be implemented to realize one or more potential advantages. One implementation may allow a UE 115 to be more-quickly allocated with uplink resources for higher priority communications, such as URLLC uplink transmissions, which may provide improved quality and reliability of service at the UE 115, as latency may be reduced The transceiver 915 may communicate bi-directionally, via one or more antennas, wired, or wireless links as described herein. For example, the transceiver 915 may represent a wireless transceiver and may communicate bi-directionally with another wireless transceiver. The transceiver 915 may also include a modem to modulate the packets and provide the modulated packets to the antennas for transmission, and to demodulate packets received from the antennas.

In some cases, the wireless device may include a single antenna 920. However, in some cases, the device may have more than one antenna 920, which may be capable of concurrently transmitting or receiving multiple wireless transmissions.

The memory 925 may include random-access memory (RAM) and read-only memory (ROM). The memory 925 may store computer-readable, computer-executable code 930 including instructions that, when executed, cause the processor to perform various functions described herein. In some cases, the memory 925 may contain, among other things, a basic input output system (BIOS) which may control basic hardware or software operation such as the interaction with peripheral components or devices.

The code 930 may include instructions to implement aspects of the present disclosure, including instructions to support wireless communications. The code 930 may be stored in a non-transitory computer-readable medium such as system memory or other type of memory. In some cases, the code 930 may not be directly executable by the processor 935 but may cause a computer (e.g., when compiled, interpreted, converted, and/or executed) to perform functions described herein.

The processor 935 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 935 may be configured to operate a memory array using a memory controller. In other cases, a memory controller may be integrated into the processor 935. The processor 935 may be configured to execute computer-readable instructions stored in a memory (e.g., the memory 925) to cause the device 905 to perform various functions (e.g., functions or tasks supporting uplink transmission cancellation).

Figure 10:
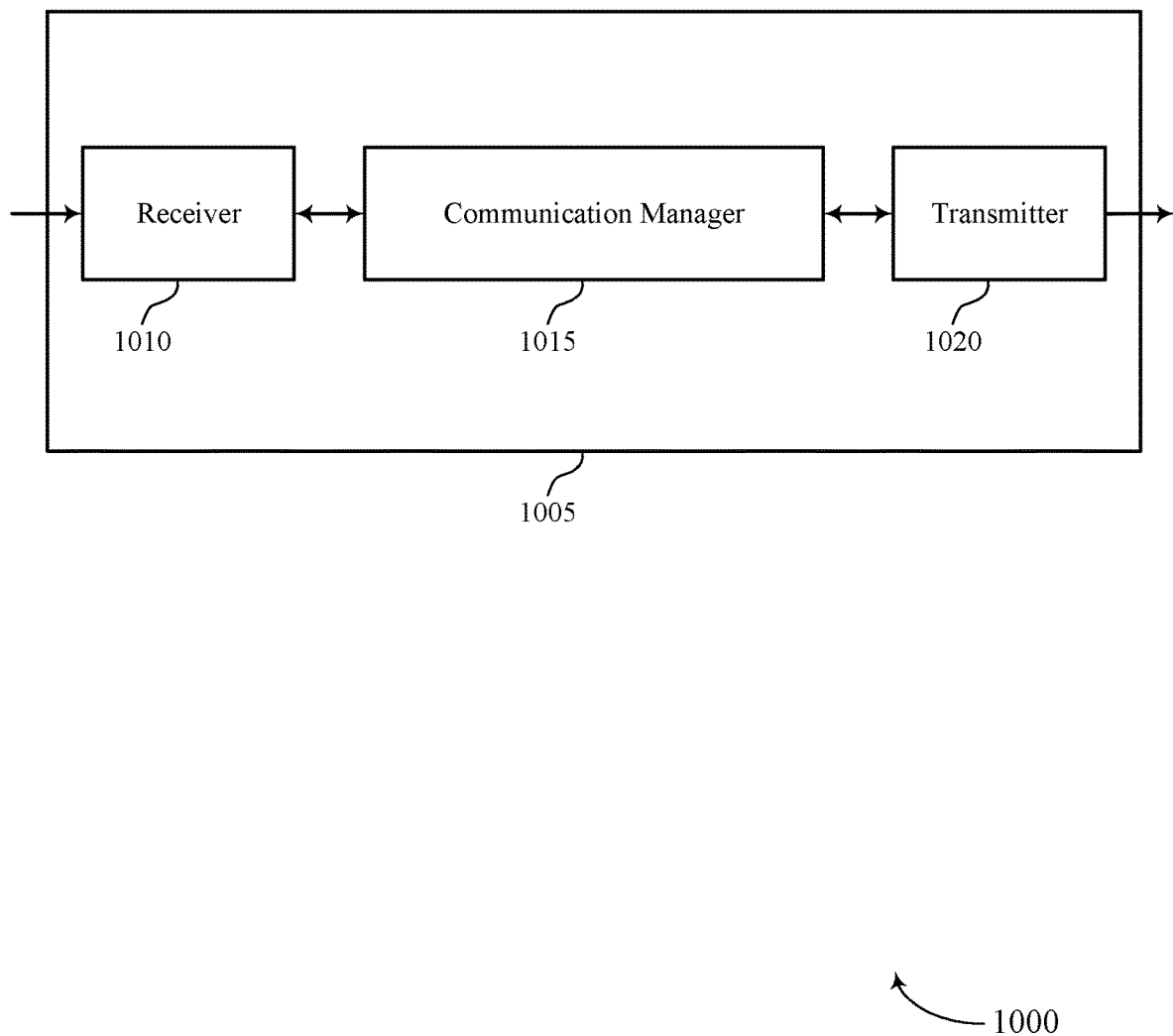
FIGS. 10 and 11 show block diagrams of devices that support uplink transmission cancellation in accordance with aspects of the present disclosure.

FIG. 10 shows a block diagram 1000 of a device 1005 that supports uplink transmission cancellation in accordance with aspects of the present disclosure. The device 1005 may be an example of aspects of a base station 105 as described herein. The device 1005 may include a receiver 1010, a communication manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to uplink transmission cancellation, etc.). Information may be passed on to other components of the device 1005. The receiver 1010 may be an example of aspects of the transceiver 1320 described with reference to FIG. 13. The receiver 1010 may utilize a single antenna or a set of antennas.

The communication manager 1015 may transmit an allocation of uplink resources associated with a first type of communications with a first latency threshold, determine a reallocation of the uplink resources based on a second type of communications with a second latency threshold that is different from the first latency threshold, and transmit an uplink cancellation indication corresponding to the uplink resources based on the determining. The communication manager 1015 may be an example of aspects of the communication manager 1310 described herein.

The communication manager 1015, or its sub-components, may be implemented in hardware, software (e.g., executed by a processor), or any combination thereof. If implemented in software executed by a processor, the functions of the communication manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communication manager 1015, or its sub-components, may be physically located at various positions, including being distributed such that portions of functions are implemented at different physical locations by one or more physical components. In some examples, the communication manager 1015, or its sub-components, may be a separate and distinct component in accordance with various aspects of the present disclosure. In some examples, the communication manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
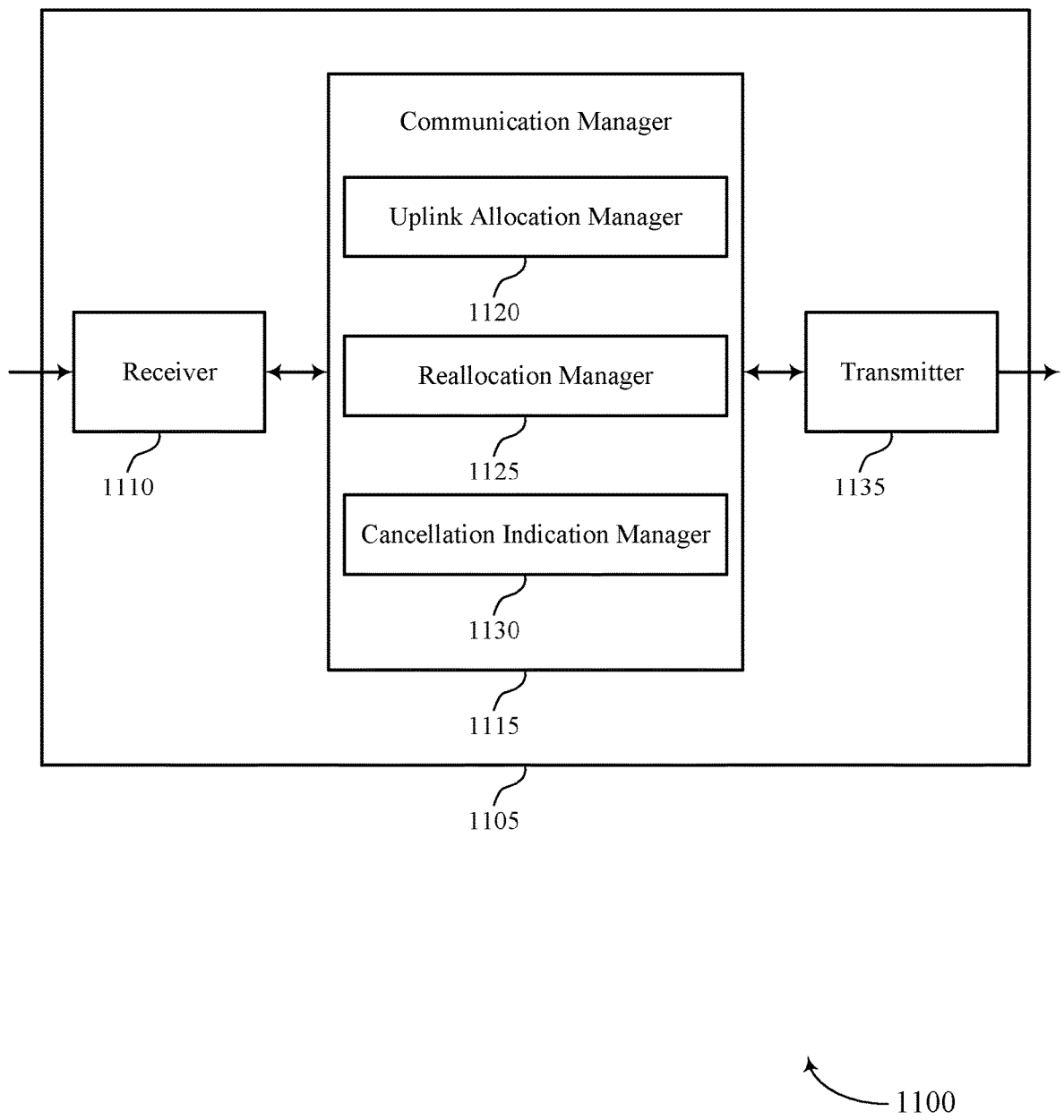

FIG. 11 shows a block diagram 1100 of a device 1105 that supports uplink transmission cancellation in accordance with aspects of the present disclosure. The device 1105 may be an example of aspects of a device 1005, or a base station 105 as described herein. The device 1105 may include a receiver 1110, a communication manager 1115, and a transmitter 1135. The device 1105 may also include a processor. Each of these components may be in communication with one another (e.g., via one or more buses).

The receiver 1110 may receive information such as packets, user data, or control information associated with various information channels (e.g., control channels, data channels, and information related to uplink transmission cancellation, etc.). Information may be passed on to other components of the device 1105. The receiver 1110 may be an example of aspects of the transceiver 1320 described with reference to FIG. 13. The receiver 1110 may utilize a single antenna or a set of antennas.

The communication manager 1115 may be an example of aspects of the communication manager 1015 as described herein. The communication manager 1115 may include an uplink allocation manager 1120, a reallocation manager 1125, and a cancellation indication manager 1130. The communication manager 1115 may be an example of aspects of the communication manager 1310 described herein.

The uplink allocation manager 1120 may transmit an allocation of uplink resources associated with a first type of communications with a first latency threshold.

The reallocation manager 1125 may determine a reallocation of the uplink resources based on a second type of communications with a second latency threshold that is different from the first latency threshold.

The cancellation indication manager 1130 may transmit an uplink cancellation indication corresponding to the uplink resources based on the determining.

The transmitter 1135 may transmit signals generated by other components of the device 1105. In some examples, the transmitter 1135 may be collocated with a receiver 1110 in a transceiver module. For example, the transmitter 1135 may be an example of aspects of the transceiver 1320 described with reference to FIG. 13. The transmitter 1135 may utilize a single antenna or a set of antennas.

Figure 12:
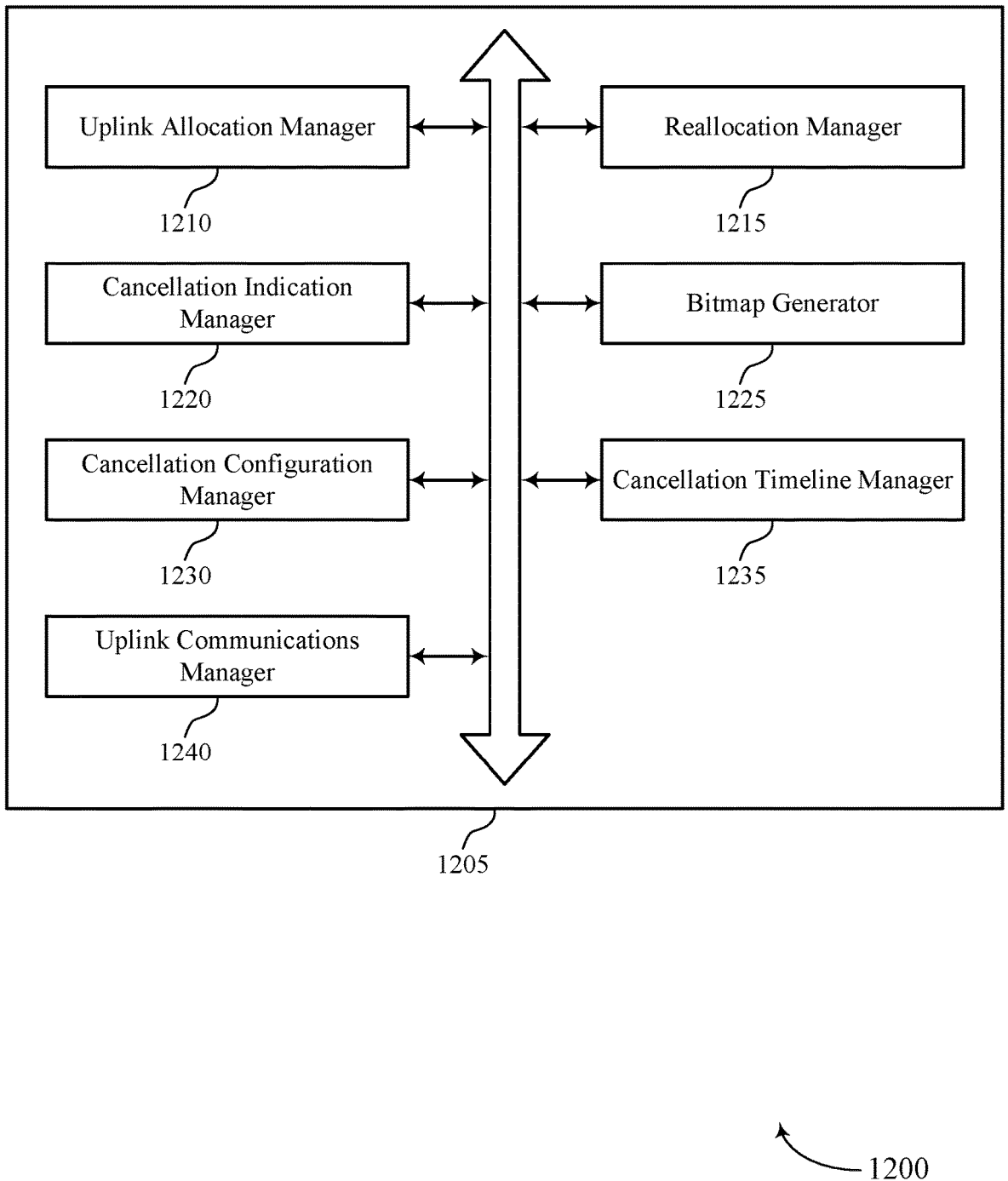
FIG. 12 shows a block diagram of a communication manager that supports uplink transmission cancellation in accordance with aspects of the present disclosure.

FIG. 12 shows a block diagram 1200 of a communication manager 1205 that supports uplink transmission cancellation in accordance with aspects of the present disclosure. The communication manager 1205 may be an example of aspects of a communication manager 1015, a communication manager 1115, or a communication manager 1310 described herein. The communication manager 1205 may include an uplink allocation manager 1210, a reallocation manager 1215, a cancellation indication manager 1220, a bitmap generator 1225, a cancellation configuration manager 1230, a cancellation timeline manager 1235, and an uplink communications manager 1240. Each of these modules may communicate, directly or indirectly, with one another (e.g., via one or more buses).

The uplink allocation manager 1210 may transmit an allocation of uplink resources associated with a first type of communications with a first latency threshold.

In some examples, the uplink allocation manager 1210 may transmit, to a UE, an uplink grant including communication resources associated with the uplink cancellation indication, the uplink grant indicating to the UE to ignore at least a portion of the uplink cancellation indication.

The reallocation manager 1215 may determine a reallocation of the uplink resources based on a second type of communications with a second latency threshold that is different from the first latency threshold.

In some examples, the reallocation manager 1215 determine a reallocation of uplink resources allocated to a physical random access channel (PRACH) based at least in part on a triggering condition for transmissions associated with the uplink resources allocated to the PRACH.

The cancellation indication manager 1220 may transmit an uplink cancellation indication corresponding to the uplink resources based on the determining.

In some examples, transmitting the uplink cancellation indication includes transmitting the bitmap.

In some examples, the cancellation indication manager 1220 may transmit a repetition indicator associated with the bitmap.

In some examples, the cancellation indication manager 1220 may transmit a group common physical downlink control channel (GC-PDCCH).

The bitmap generator 1225 may generate a bitmap associated with a set of communication resources in the time domain and frequency domain, each bit of the bitmap corresponding to a respective subset of the communication resources, and each bit indicating whether or not cancellation applies to the respective subset of the communication resources.

The cancellation configuration manager 1230 may transmit a cancellation configuration, prior to transmitting the uplink cancellation indication, associated with a pattern of communication resources in the time domain and frequency domain, where the uplink cancellation indication indicates a time for applying the pattern of communication resources for cancellation.

In some examples, the cancellation configuration manager 1230 may transmit an RRC configuration.

The cancellation timeline manager 1235 may determine a time for applying cancellation based on a time of transmitting the uplink cancellation indication and a configured time offset for cancellation.

The uplink communications manager 1240 may receive communications from one or more user equipments (UEs) based on the reallocation of the uplink resources and transmitting the uplink cancellation indication.

In some cases, the first type of communications includes enhanced mobile broadband (eMBB) communications and the second type of communications includes ultra-reliable low latency communications (URLLC).

Figure 13:
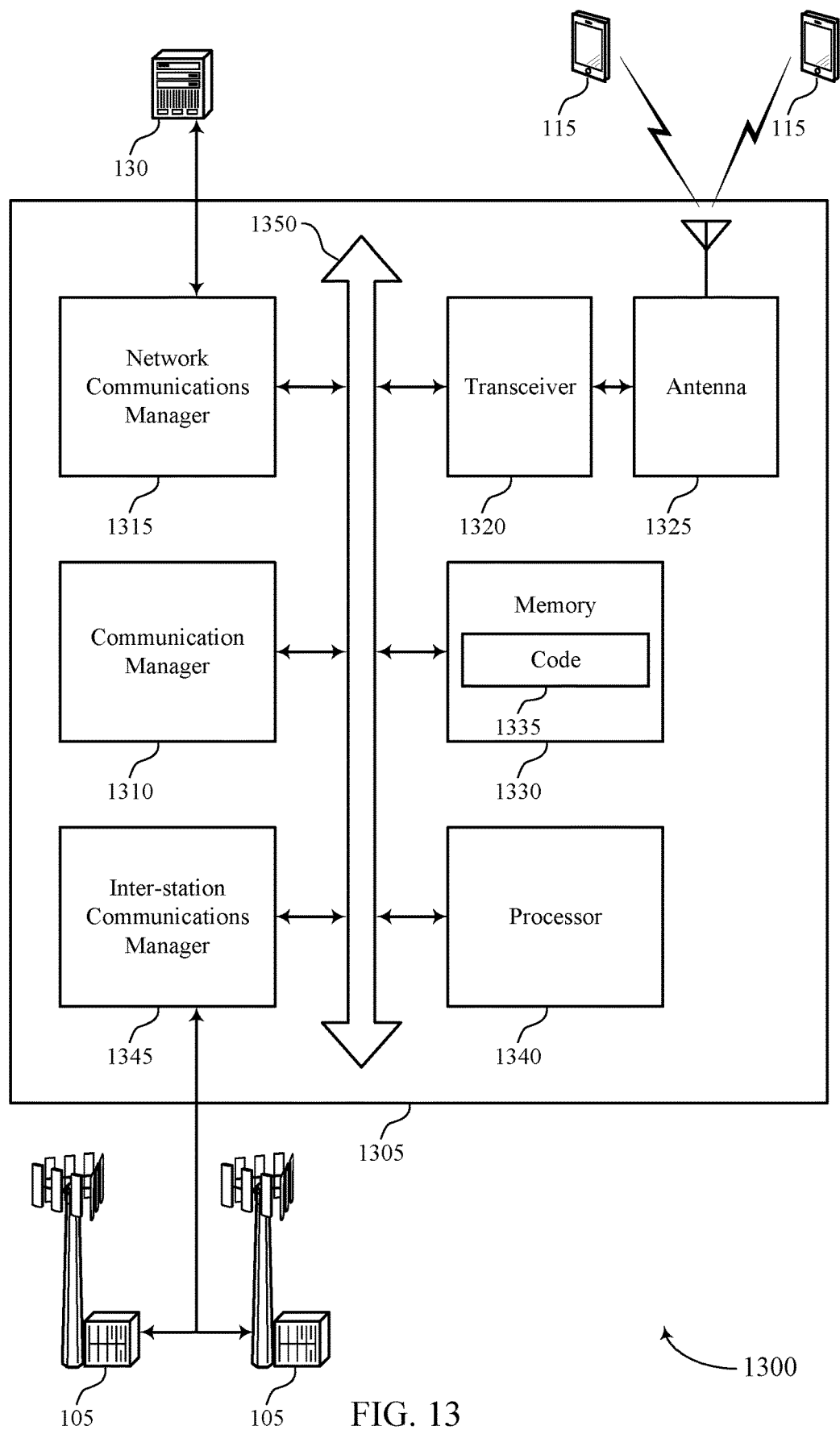
FIG. 13 shows a diagram of a system including a device that supports uplink transmission cancellation in accordance with aspects of the present disclosure.

FIG. 13 shows a diagram of a system 1300 including a device 1305 that supports uplink transmission cancellation in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communication manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communication manager 1310 may transmit an allocation of uplink resources associated with a first type of communications with a first latency threshold, determine a reallocation of the uplink resources based on a second type of communications with a second latency threshold that is different from the first latency threshold, and transmit an uplink cancellation indication corresponding to the uplink resources based on the determining.

The actions performed by the communications manager 1310 as described herein may be implemented to realize one or more potential advantages. One implementation may allow a base station 105 or other network entity to more quickly reallocate uplink resources to different types communications, which may have different latency thresholds, reliability thresholds, or other prioritization. Another implementation may provide improved quality and reliability of service for various UEs 115 of a wireless communications system, as latency may be reduced and reliability may be improved for higher-priority communications.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described herein. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases, the device may have more than one antenna 1325, which may be capable of concurrently transmitting or receiving multiple wireless transmissions.

The memory 1330 may include RAM and ROM. The memory 1330 may store computer-readable, computer-executable code 1330 including instructions that, when executed, cause the processor to perform various functions described herein. In some cases, the memory 1330 may contain, among other things, a BIOS which may control basic hardware or software operation such as the interaction with peripheral components or devices.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled, interpreted, converted and/or executed) to perform functions described herein.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting uplink transmission cancellation).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

Figure 14:
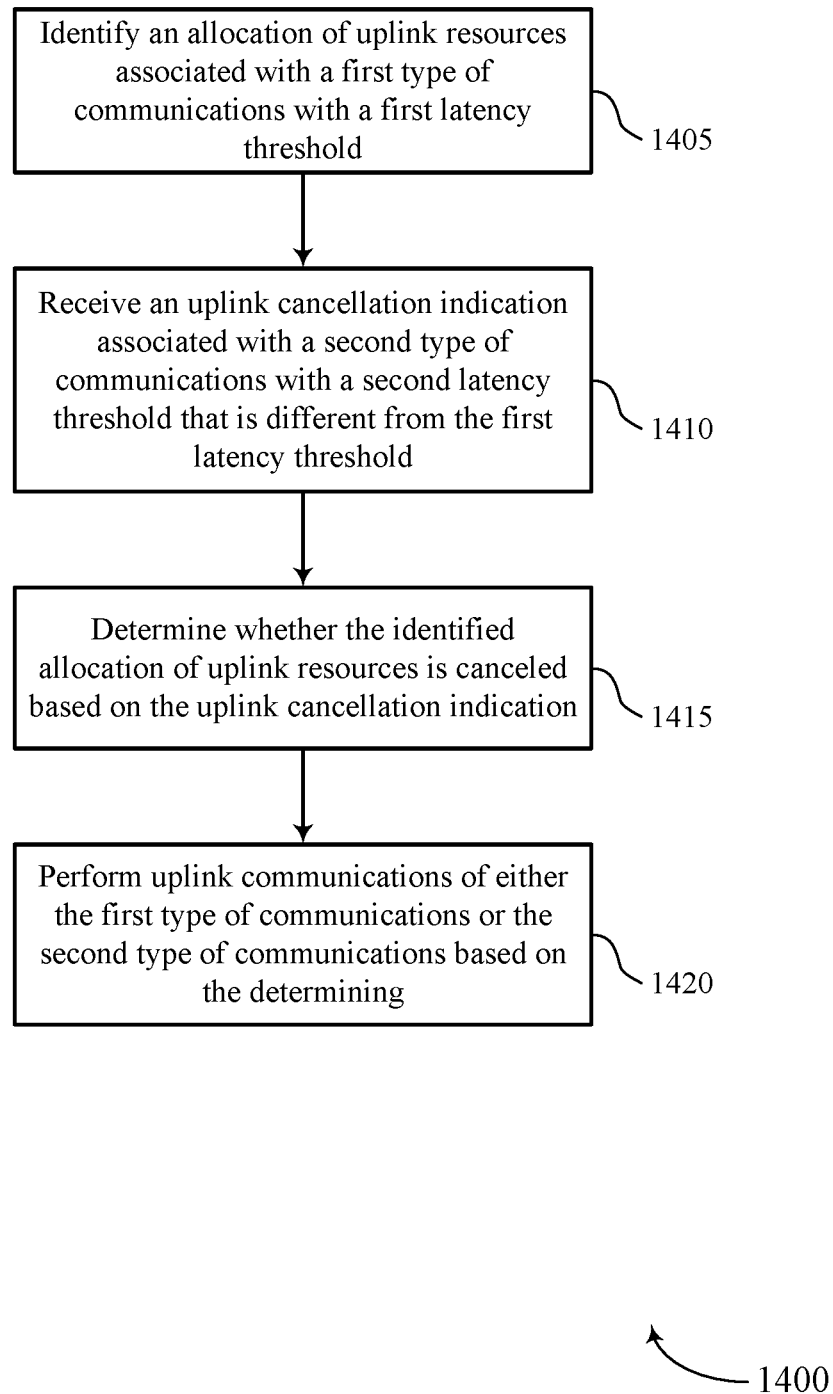
FIGS. 14 through 17 show flowcharts illustrating methods that support uplink transmission cancellation in accordance with aspects of the present disclosure.

FIG. 14 shows a flowchart illustrating a method 1400 that supports uplink transmission cancellation in accordance with aspects of the present disclosure. The operations of method 1400 may be implemented by a UE 115 or its components as described herein. For example, the operations of method 1400 may be performed by a communication manager as described with reference to FIGS. 6 through 9. In some examples, a UE may execute a set of instructions to control the functional elements of the UE to perform the described functions. Additionally or alternatively, a UE may perform aspects of the described functions using special-purpose hardware.

At 1405, the UE may identify an allocation of uplink resources associated with a first type of communications with a first latency threshold. The operations of 1405 may be performed according to the methods described herein. In some examples, aspects of the operations of 1405 may be performed by an uplink allocation manager as described with reference to FIGS. 6 through 9.

At 1410, the UE may receive an uplink cancellation indication associated with a second type of communications with a second latency threshold that is different from the first latency threshold. The operations of 1410 may be performed according to the methods described herein. In some examples, aspects of the operations of 1410 may be performed by an uplink cancellation manager as described with reference to FIGS. 6 through 9.

At 1415, the UE may determine whether the identified allocation of uplink resources is canceled based on the uplink cancellation indication. The operations of 1415 may be performed according to the methods described herein. In some examples, aspects of the operations of 1415 may be performed by an uplink cancellation manager as described with reference to FIGS. 6 through 9.

At 1420, the UE may perform uplink communications of either the first type of communications or the second type of communications based on the determining. The operations of 1420 may be performed according to the methods described herein. In some examples, aspects of the operations of 1420 may be performed by an uplink communications manager as described with reference to FIGS. 6 through 9.

Figure 15:
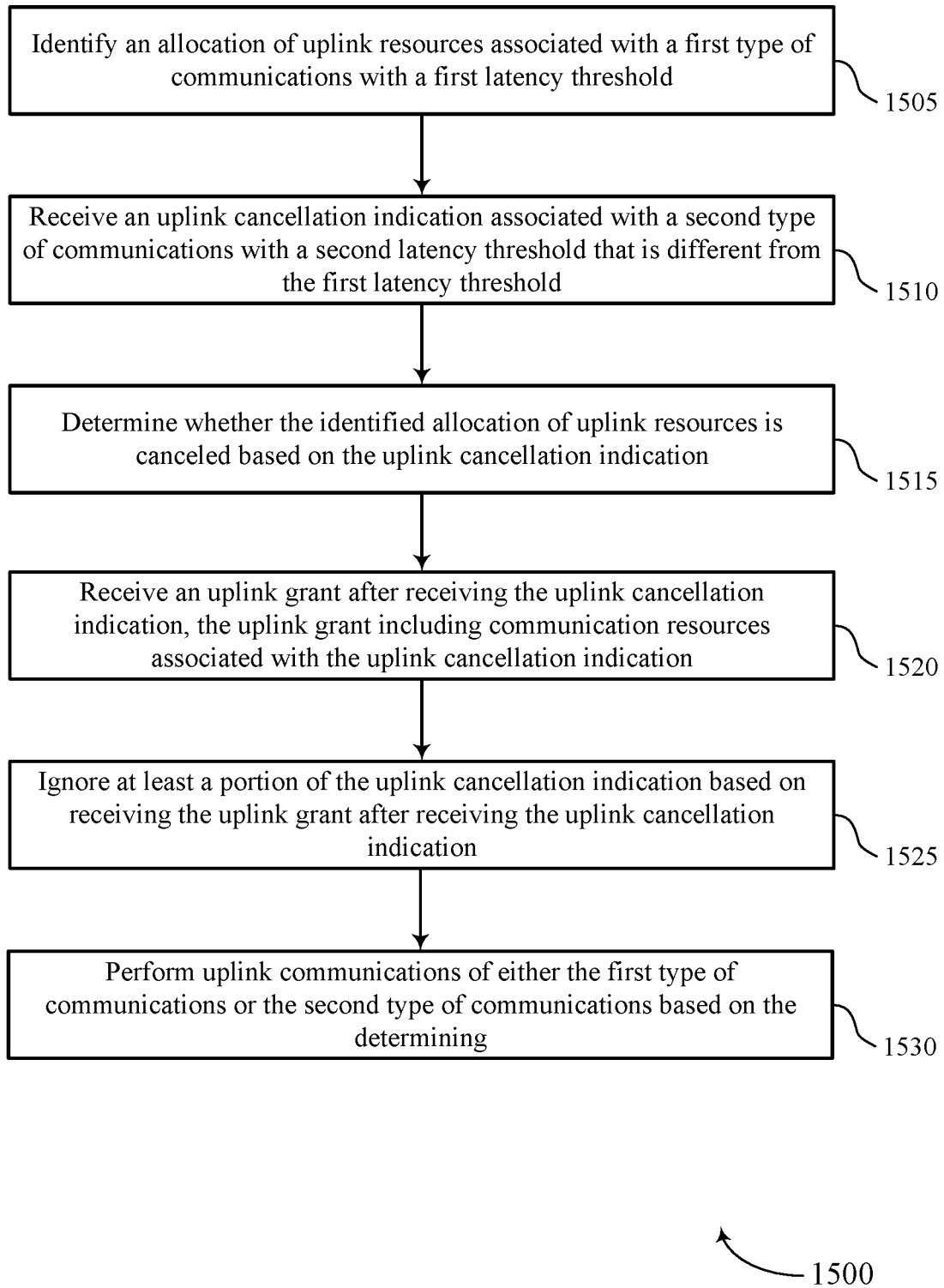

FIG. 15 shows a flowchart illustrating a method 1500 that supports uplink transmission cancellation in accordance with aspects of the present disclosure. The operations of method 1500 may be implemented by a UE 115 or its components as described herein. For example, the operations of method 1500 may be performed by a communication manager as described with reference to FIGS. 6 through 9. In some examples, a UE may execute a set of instructions to control the functional elements of the UE to perform the described functions. Additionally or alternatively, a UE may perform aspects of the described functions using special-purpose hardware.

At 1505, the UE may identify an allocation of uplink resources associated with a first type of communications with a first latency threshold. The operations of 1505 may be performed according to the methods described herein. In some examples, aspects of the operations of 1505 may be performed by an uplink allocation manager as described with reference to FIGS. 6 through 9.

At 1510, the UE may receive an uplink cancellation indication associated with a second type of communications with a second latency threshold that is different from the first latency threshold. The operations of 1510 may be performed according to the methods described herein. In some examples, aspects of the operations of 1510 may be performed by an uplink cancellation manager as described with reference to FIGS. 6 through 9.

At 1515, the UE may determine whether the identified allocation of uplink resources is canceled based on the uplink cancellation indication. The operations of 1515 may be performed according to the methods described herein. In some examples, aspects of the operations of 1515 may be performed by an uplink cancellation manager as described with reference to FIGS. 6 through 9.

At 1520, the UE may receive an uplink grant after receiving the uplink cancellation indication, the uplink grant including communication resources associated with the uplink cancellation indication. The operations of 1520 may be performed according to the methods described herein. In some examples, aspects of the operations of 1520 may be performed by an uplink allocation manager as described with reference to FIGS. 6 through 9.

At 1525, the UE may ignore at least a portion of the uplink cancellation indication based on receiving the uplink grant after receiving the uplink cancellation indication. The operations of 1525 may be performed according to the methods described herein. In some examples, aspects of the operations of 1525 may be performed by an uplink cancellation manager as described with reference to FIGS. 6 through 9.

At 1530, the UE may perform uplink communications of either the first type of communications or the second type of communications based on the determining. The operations of 1530 may be performed according to the methods described herein. In some examples, aspects of the operations of 1530 may be performed by an uplink communications manager as described with reference to FIGS. 6 through 9.

Figure 16:
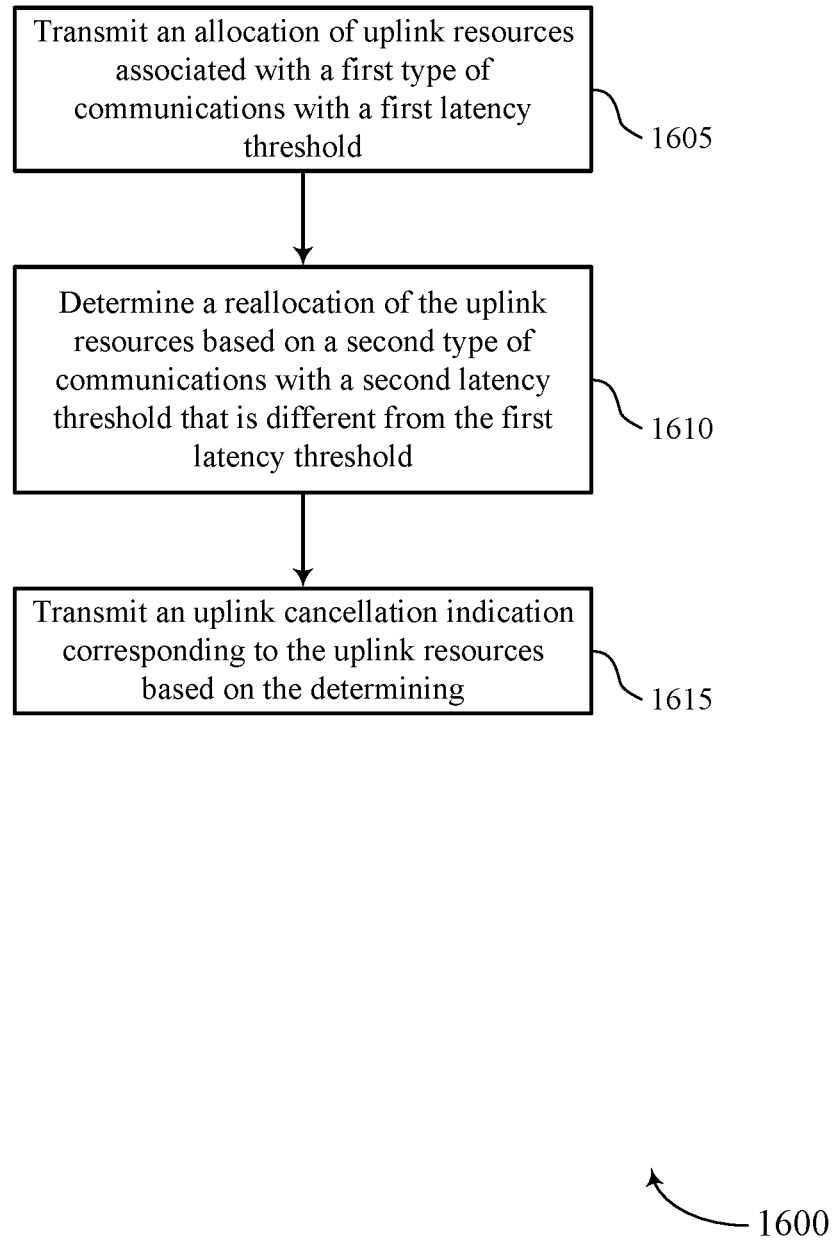

FIG. 16 shows a flowchart illustrating a method 1600 that supports uplink transmission cancellation in accordance with aspects of the present disclosure. The operations of method 1600 may be implemented by a base station 105 or its components as described herein. For example, the operations of method 1600 may be performed by a communication manager as described with reference to FIGS. 10 through 13. In some examples, a base station may execute a set of instructions to control the functional elements of the base station to perform the described functions. Additionally or alternatively, a base station may perform aspects of the described functions using special-purpose hardware.

At 1605, the base station may transmit an allocation of uplink resources associated with a first type of communications with a first latency threshold. The operations of 1605 may be performed according to the methods described herein. In some examples, aspects of the operations of 1605 may be performed by an uplink allocation manager as described with reference to FIGS. 10 through 13.

At 1610, the base station may determine a reallocation of the uplink resources based on a second type of communications with a second latency threshold that is different from the first latency threshold. The operations of 1610 may be performed according to the methods described herein. In some examples, aspects of the operations of 1610 may be performed by a reallocation manager as described with reference to FIGS. 10 through 13.

At 1615, the base station may transmit an uplink cancellation indication corresponding to the uplink resources based on the determining. The operations of 1615 may be performed according to the methods described herein. In some examples, aspects of the operations of 1615 may be performed by a cancellation indication manager as described with reference to FIGS. 10 through 13.

Figure 17:
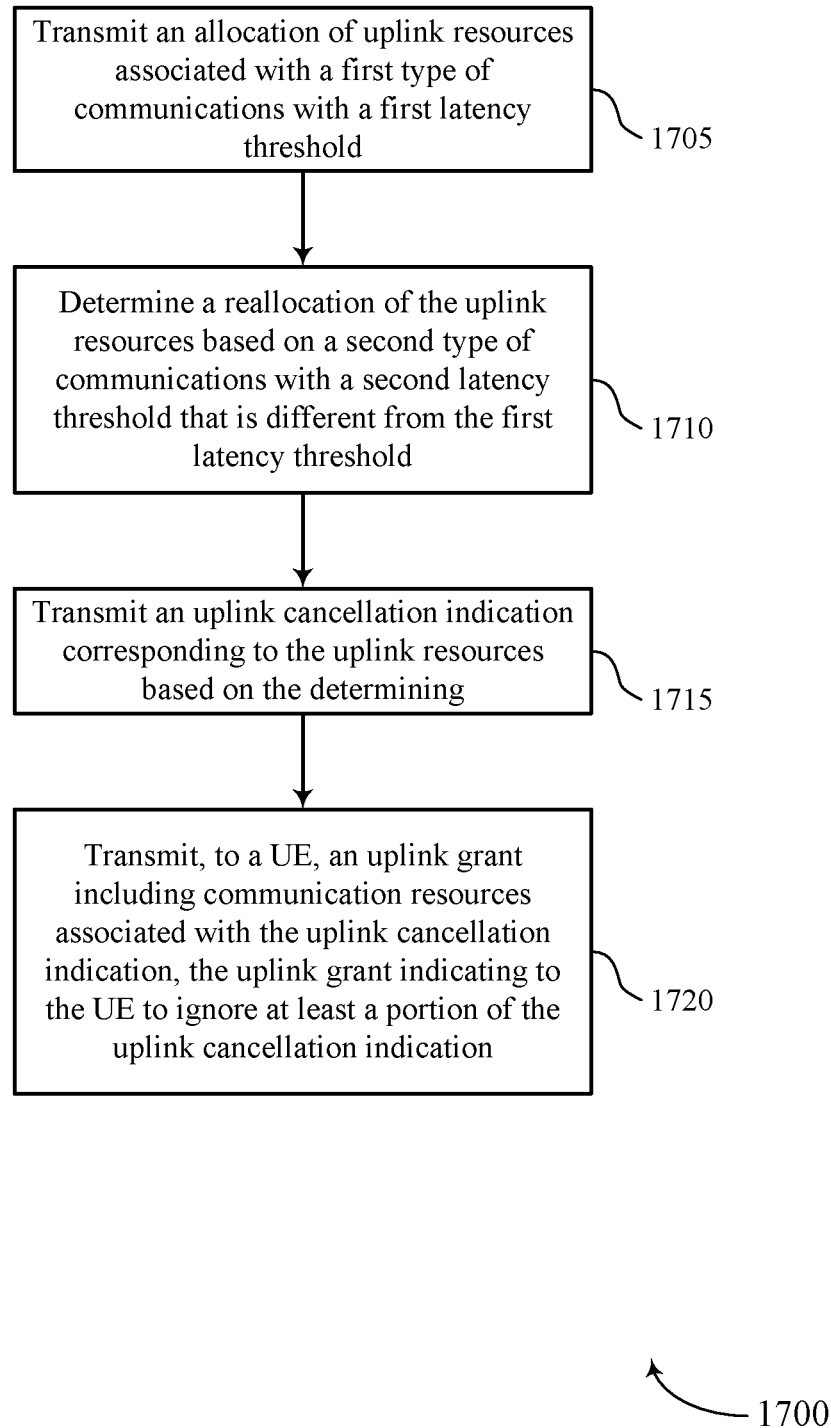

FIG. 17 shows a flowchart illustrating a method 1700 that supports uplink transmission cancellation in accordance with aspects of the present disclosure. The operations of method 1700 may be implemented by a base station 105 or its components as described herein. For example, the operations of method 1700 may be performed by a communication manager as described with reference to FIGS. 10 through 13. In some examples, a base station may execute a set of instructions to control the functional elements of the base station to perform the described functions. Additionally or alternatively, a base station may perform aspects of the described functions using special-purpose hardware.

At 1705, the base station may transmit an allocation of uplink resources associated with a first type of communications with a first latency threshold. The operations of 1705 may be performed according to the methods described herein. In some examples, aspects of the operations of 1705 may be performed by an uplink allocation manager as described with reference to FIGS. 10 through 13.

At 1710, the base station may determine a reallocation of the uplink resources based on a second type of communications with a second latency threshold that is different from the first latency threshold. The operations of 1710 may be performed according to the methods described herein. In some examples, aspects of the operations of 1710 may be performed by a reallocation manager as described with reference to FIGS. 10 through 13.

At 1715, the base station may transmit an uplink cancellation indication corresponding to the uplink resources based on the determining. The operations of 1715 may be performed according to the methods described herein. In some examples, aspects of the operations of 1715 may be performed by a cancellation indication manager as described with reference to FIGS. 10 through 13.

At 1720, the base station may transmit, to a UE, an uplink grant including communication resources associated with the uplink cancellation indication, the uplink grant indicating to the UE to ignore at least a portion of the uplink cancellation indication. The operations of 1720 may be performed according to the methods described herein. In some examples, aspects of the operations of 1720 may be performed by an uplink allocation manager as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, or any combination thereof. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. If implemented in software (e.g., executed by a processor), the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on." As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), the method comprising:

identifying an allocation of uplink resources for an uplink transmission by the UE;

receiving an uplink cancellation indication indicating a cancellation of a set of communication resources in the time domain and in the frequency domain; and determining whether to cancel at least a portion of the uplink transmission based at least in part on the uplink cancellation indication, wherein determining whether to cancel at least a portion of the uplink transmission comprises:

identifying a bitmap of the uplink cancellation indication associated with the set of communication resources in the time domain and frequency domain, each bit of the bitmap corresponding to a respective subset of the set of communication resources, and each bit indicating whether or not cancellation applies to the respective subset of the set of communication resources;

determining whether at least a portion of the allocation of uplink resources corresponds to one or more of the subsets of the set of communication resources for which cancellation applies, wherein determining whether to cancel at least a portion of the uplink transmission comprises determining a time for applying cancellation based at least in part on a time of receiving the uplink cancellation indication and a time offset for the cancellation; and performing uplink communications based at least in part on determining whether to cancel at least a portion of the uplink transmission.

2. The method of claim 1, further comprising:
determining that the respective subset of the set of communication resources corresponding to each bit of the bitmap corresponds to uplink resources of an uplink/downlink time division duplex (TDD) configuration of the UE.

3. The method of claim 1, wherein the time offset for the cancellation is based at least in part on a capability of the UE.

4. The method of claim 1, wherein determining the time for applying cancellation is based at least in part on an uplink/downlink time division duplex (TDD) configuration of the UE.

5. The method of claim 1, further comprising:
receiving an uplink grant after receiving the uplink cancellation indication, the uplink grant comprising communication resources associated with the uplink cancellation indication; and
ignoring at least a portion of the uplink cancellation indication based at least in part on receiving the uplink grant after receiving the uplink cancellation indication.

6. The method of claim 1, wherein determining whether to cancel at least a portion of the uplink transmission is based at least in part on a type of physical channel associated with the uplink communications.

7. The method of claim 1, wherein determining whether to cancel at least a portion of the uplink transmission is based at least in part on a type of physical channel associated with the uplink cancellation indication.

8. The method of claim 1, wherein determining whether to cancel at least a portion of the uplink transmission is based at least in part on an allocation type associated with the identified allocation of uplink resources.

9. The method of claim 1, wherein determining whether to cancel at least a portion of the uplink transmission is based at least in part on a type of communications associated with the uplink communications.

10. The method of claim 1, wherein performing the uplink communications comprises:
refraining from using at least a portion of the allocation of uplink resources based at least in part on the determining.

11. The method of claim 1, wherein the determining whether to cancel at least a portion of the uplink transmission comprises:

determining whether to cancel the at least a portion of the uplink transmission based at least in part on a priority associated with the uplink cancellation indication.

12. The method of claim 1, wherein receiving the uplink cancellation indication comprises:
receiving the uplink cancellation indication in group-common downlink control information.

13. The method of claim 1, wherein receiving the uplink cancellation indication comprises:
monitoring a physical downlink control channel based at least in part on a radio network temporary identifier associated with an uplink cancellation indication configuration.

14. The method of claim 1, wherein performing the uplink communications comprises:
transmitting a sounding reference signal in one or more symbols of the allocation of uplink resources that are not indicated for cancelation by the uplink cancellation indication.

15. An apparatus comprising:
at least one processor; and
memory coupled to the at least one processor, the memory storing instructions executable by the at least one processor to cause the apparatus to:
identify an allocation of uplink resources for an uplink transmission;
receive an uplink cancellation indication indicating a cancellation of a set of communication resources in the time domain and in the frequency domain; and
determine whether to cancel at least a portion of the uplink transmission based at least in part on the uplink cancellation indication, wherein, to determine whether to cancel at least a portion of the uplink transmission, the instructions are executable to cause the apparatus to:
identify a bitmap of the uplink cancellation indication associated with the set of communication resources in the time domain and frequency domain, each bit of the bitmap corresponding to a respective subset of the set of communication resources, and each bit indicating whether or not cancellation applies to the respective subset of the set of communication resources;
determine whether at least a portion of the allocation of uplink resources corresponds to one or more of the subsets of the set of communication resources for which cancellation applies, wherein determining whether to cancel at least a portion of the uplink transmission comprises determining a time for applying cancellation based at least in part on a time of receiving the uplink cancellation indication and a time offset for the cancellation; and
perform uplink communications based at least in part on determining whether to cancel at least a portion of the uplink transmission.

16. The apparatus of claim 15, wherein the time offset for the cancellation is based at least in part on a capability of the UE.

17. The apparatus of claim 15, wherein the instructions are further executable by the at least one processor to cause the apparatus to:
determine that the respective subset of the set of communication resources corresponding to each bit of the bitmap corresponds to uplink resources of an uplink/downlink time division duplex (TDD) configuration of the UE.

18. The apparatus of claim 15, wherein determining the time for applying cancellation is based at least in part on an uplink/downlink time division duplex (TDD) configuration of the UE.

19. The apparatus of claim 15, wherein the instructions are further executable by the at least one processor to cause the apparatus to:
receive an uplink grant after receiving the uplink cancellation indication, the uplink grant comprising communication resources associated with the uplink cancellation indication; and
ignore at least a portion of the uplink cancellation indication based at least in part on receiving the uplink grant after receiving the uplink cancellation indication.

20. The apparatus of claim 15, wherein determining whether to cancel at least a portion of the uplink transmission is based at least in part on a type of physical channel associated with the uplink communications.

21. The apparatus of claim 15, wherein determining whether to cancel at least a portion of the uplink transmission is based at least in part on a type of physical channel associated with the uplink cancellation indication.

22. The apparatus of claim 15, wherein determining whether to cancel at least a portion of the uplink transmission is based at least in part on an allocation type associated with the identified allocation of uplink resources.

23. The apparatus of claim 15, wherein determining whether to cancel at least a portion of the uplink transmission is based at least in part on a type of communications associated with the uplink communications.

24. The apparatus of claim 15, wherein the instructions to perform the uplink communications are executable by the at least one processor to cause the apparatus to:
refrain from using at least a portion of the allocation of uplink resources based at least in part on the determining.

25. The apparatus of claim 15, wherein the instructions to determine whether to cancel at least a portion of the uplink transmission are executable by the at least one processor to cause the apparatus to:
determine whether to cancel the at least a portion of the uplink transmission based at least in part on a priority associated with the uplink cancellation indication.

26. The apparatus of claim 15, wherein the instructions to receive the uplink cancellation indication are executable by the at least one processor to cause the apparatus to:
receive the uplink cancellation indication in group-common downlink control information.

27. The apparatus of claim 15, wherein the instructions to receive the uplink cancellation indication are executable by the at least one processor to cause the apparatus to:
monitor a physical downlink control channel based at least in part on a radio network temporary identifier associated with an uplink cancellation indication configuration.

28. The apparatus of claim 15, wherein the instructions to perform the uplink communications are executable by the at least one processor to cause the apparatus to:
transmit a sounding reference signal in one or more symbols of the allocation of uplink resources that are not indicated for cancelation by the uplink cancellation indication.

29. An apparatus for wireless communications at a user equipment (UE), comprising:

means for identifying an allocation of uplink resources for an uplink transmission by the UE;
means for receiving an uplink cancellation indication indicating a cancellation of a set of communication resources in the time domain and in the frequency domain; and
means for determining whether to cancel at least a portion of the uplink transmission based at least in part on the uplink cancellation indication, wherein determining whether to cancel at least a portion of the uplink transmission comprises:
means for identifying a bitmap of the uplink cancellation indication associated with the set of communication resources in the time domain and frequency domain, each bit of the bitmap corresponding to a respective subset of the set of communication resources, and each bit indicating whether or not cancellation applies to the respective subset of the set of communication resources;
means for determining whether at least a portion of the allocation of uplink resources corresponds to one or more of the subsets of the set of communication resources for which cancellation applies, wherein determining whether to cancel at least a portion of the uplink transmission comprises determining a time for applying cancellation based at least in part on a time of receiving the uplink cancellation indication and a time offset for the cancellation; and
means for performing uplink communications based at least in part on determining whether to cancel at least a portion of the uplink transmission.

30. A non-transitory computer-readable medium storing code for wireless communications at a user equipment (UE), the code comprising instructions executable by at least one processor to:
identify an allocation of uplink resources for an uplink transmission by the UE;
receive an uplink cancellation indication indicating a cancellation of a set of communication resources in the time domain and in the frequency domain; and
determine whether to cancel at least a portion of the uplink transmission based at least in part on the uplink cancellation indication, wherein determining whether to cancel at least a portion of the uplink transmission comprises:
identify a bitmap of the uplink cancellation indication associated with the set of communication resources in the time domain and frequency domain, each bit of the bitmap corresponding to a respective subset of the set of communication resources, and each bit indicating whether or not cancellation applies to the respective subset of the set of communication resources;
determine whether at least a portion of the allocation of uplink resources corresponds to one or more of the subsets of the set of communication resources for which cancellation applies, wherein determining whether to cancel at least a portion of the uplink transmission comprises determining a time for applying cancellation based at least in part on a time of receiving the uplink cancellation indication and a time offset for the cancellation; and
perform uplink communications based at least in part on determining whether to cancel at least a portion of the uplink transmission.

* * * * *